(12) United States Patent
Glew et al.

(10) Patent No.: US 9,813,445 B2
(45) Date of Patent: Nov. 7, 2017

(54) TAINT INJECTION AND TRACKING

(71) Applicant: Elwha LLC, Bellevue, WA (US)

(72) Inventors: Andrew F. Glew, Portland, OR (US);
Daniel A. Gerrity, Seattle, WA (US);
Clarence T. Tegreene, Mercer Island, WA (US)

(73) Assignee: Elwha LLC, Bellevue, WA (US)

( * ) Notice: Subject to any disclaimer, the term of this patent is extended or adjusted under 35 U.S.C. 154(b) by 5 days.

(21) Appl. No.: 15/080,262

(22) Filed: Mar. 24, 2016

(65) Prior Publication Data

US 2016/0277441 A1 Sep. 22, 2016

Related U.S. Application Data

(63) Continuation of application No. 13/373,832, filed on Nov. 30, 2011, now Pat. No. 9,298,918, which is a continuation-in-part of application No. 13/317,980, filed on Oct. 31, 2011, now Pat. No. 9,460,290, which is a continuation-in-part of application No. 13/317,825, filed on Oct. 28, 2011, now abandoned, which is a continuation-in-part of application No. 13/317,826, filed on Oct. 28, 2011, now Pat. No. 8,813,085, which is a continuation-in-part of application No. 13/317,834, filed on Oct. 28, 2011, now Pat. No. 9,098,608, which is a continuation-in-part of application No. 13/200,556, filed on Sep. 24, 2011, now Pat. No. 9,471,373.

(51) Int. Cl.
*H04L 29/06* (2006.01)
*G06F 21/56* (2013.01)

(52) U.S. Cl.
CPC .......... *H04L 63/1466* (2013.01); *G06F 21/56* (2013.01)

(58) Field of Classification Search
None
See application file for complete search history.

(56) References Cited

U.S. PATENT DOCUMENTS

| | | | |
|---|---|---|---|
| 7,069,447 | B1 | 6/2006 | Corder |
| 7,577,992 | B2 | 8/2009 | Abadi et al. |
| 7,823,135 | B2 | 10/2010 | Homing et al. |
| 8,056,138 | B2 | 11/2011 | Jin et al. |
| 8,136,091 | B2 | 3/2012 | Erlingsson et al. |
| 8,561,183 | B2 | 10/2013 | Muth et al. |
| 9,104,895 | B2 | 8/2015 | Martini |
| 2003/0159070 | A1 | 8/2003 | Mayer et al. |
| 2004/0059934 | A1 | 3/2004 | Kohiyama et al. |
| 2006/0195906 | A1 | 8/2006 | Jin et al. |

(Continued)

OTHER PUBLICATIONS

Bachrach et al.; "Distributed Multiagent Resource Allocation Diminishing Marginal Return Domains"; Proc. of $7^{th}$ Int. Conf. on Autonomous Agents and Multiagent Systems (AAMAS 2008); bearing a date of May 12-16, 2008; pp. 1103-1110; located at: www.ifaamas.org.

(Continued)

*Primary Examiner* — David Le

(57) ABSTRACT

An embodiment or embodiments of an electronic device can comprise an input interface and a hardware component coupled to the input interface. The input interface can be operable to receive a plurality of taint indicators corresponding to at least one of a plurality of taints indicative of potential security risk which are injected from at least one of a plurality of resources. The hardware component can be operable to track the plurality of taints.

20 Claims, 23 Drawing Sheets

(56) References Cited

U.S. PATENT DOCUMENTS

2008/0052539 A1    2/2008   MacMillan et al.
2009/0187743 A1    7/2009   Greenhalgh
2011/0296440 A1   12/2011   Laurich et al.

OTHER PUBLICATIONS

"Imation Mobile Security"; Imation Corp; bearing a date of Oct. 2015; pp. 1-4; located at: http://www.ironkey.com/en-US/resources/documnts/IronKey_ProductFamily_US.pdf.
Rajput, Dhanraj; "Designing Secure USB-Based Dongles"; bearing a date of Dec. 2011; Cypress Semiconductor Corporation; pp. 1-7; EE Times Industrial Control; located at: http://www.cypress.com/file/110461/download.

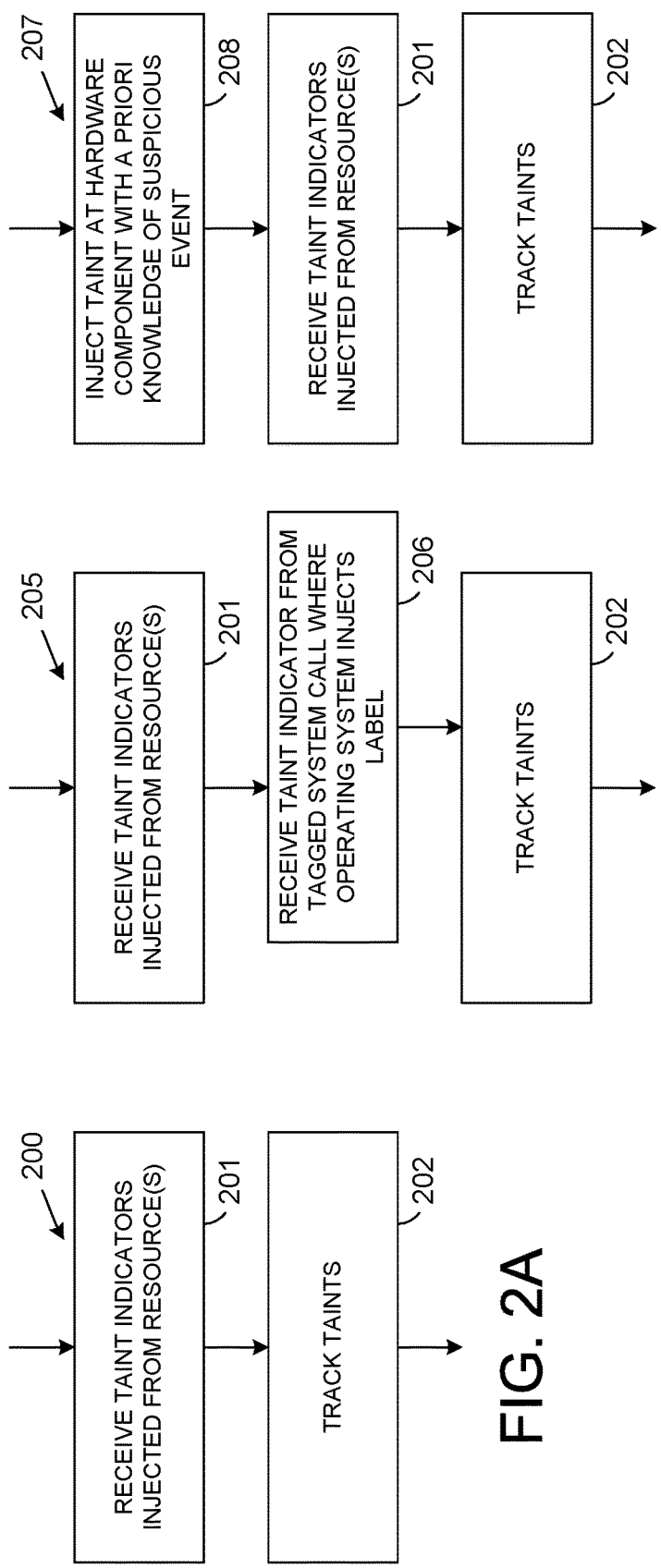

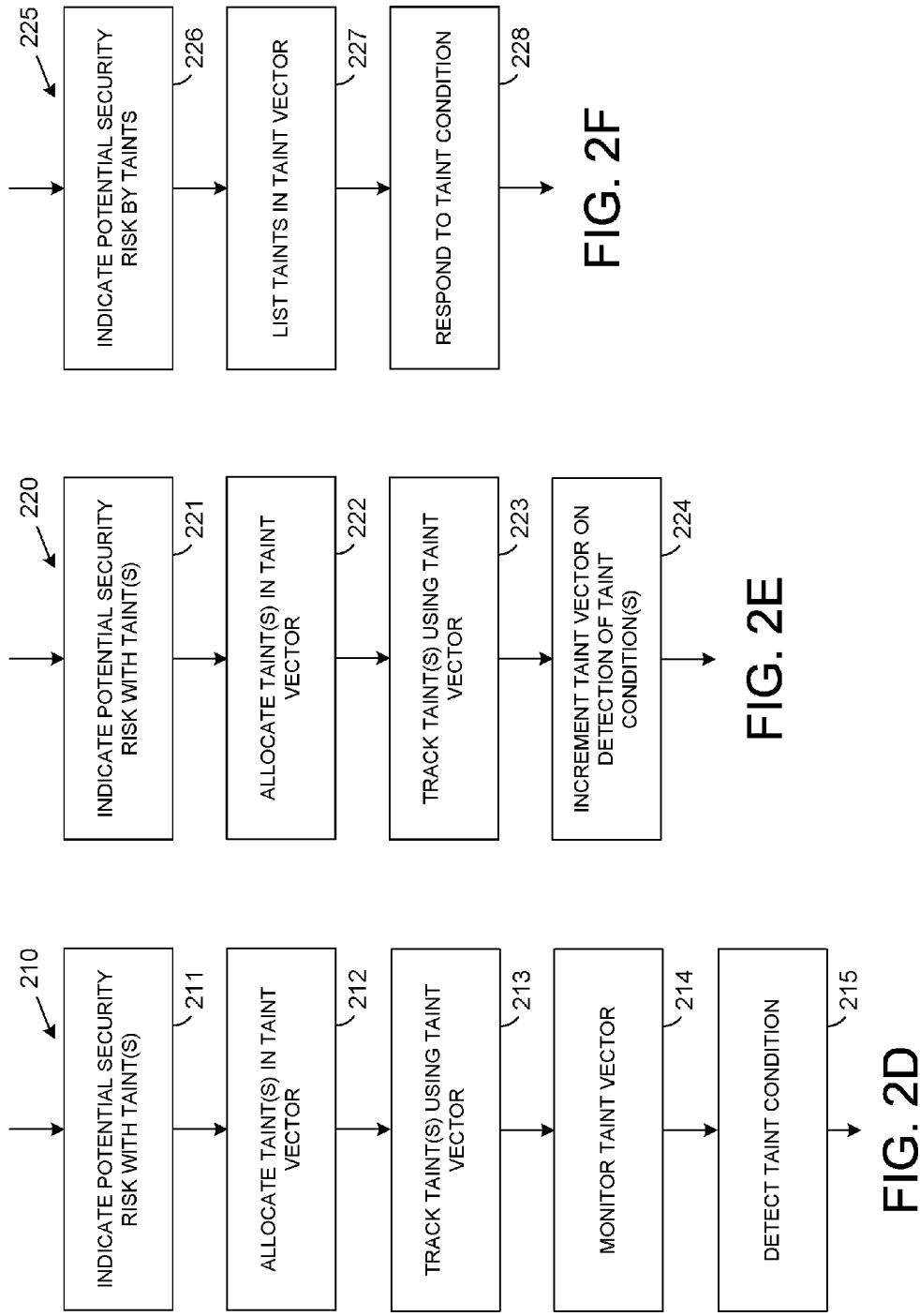

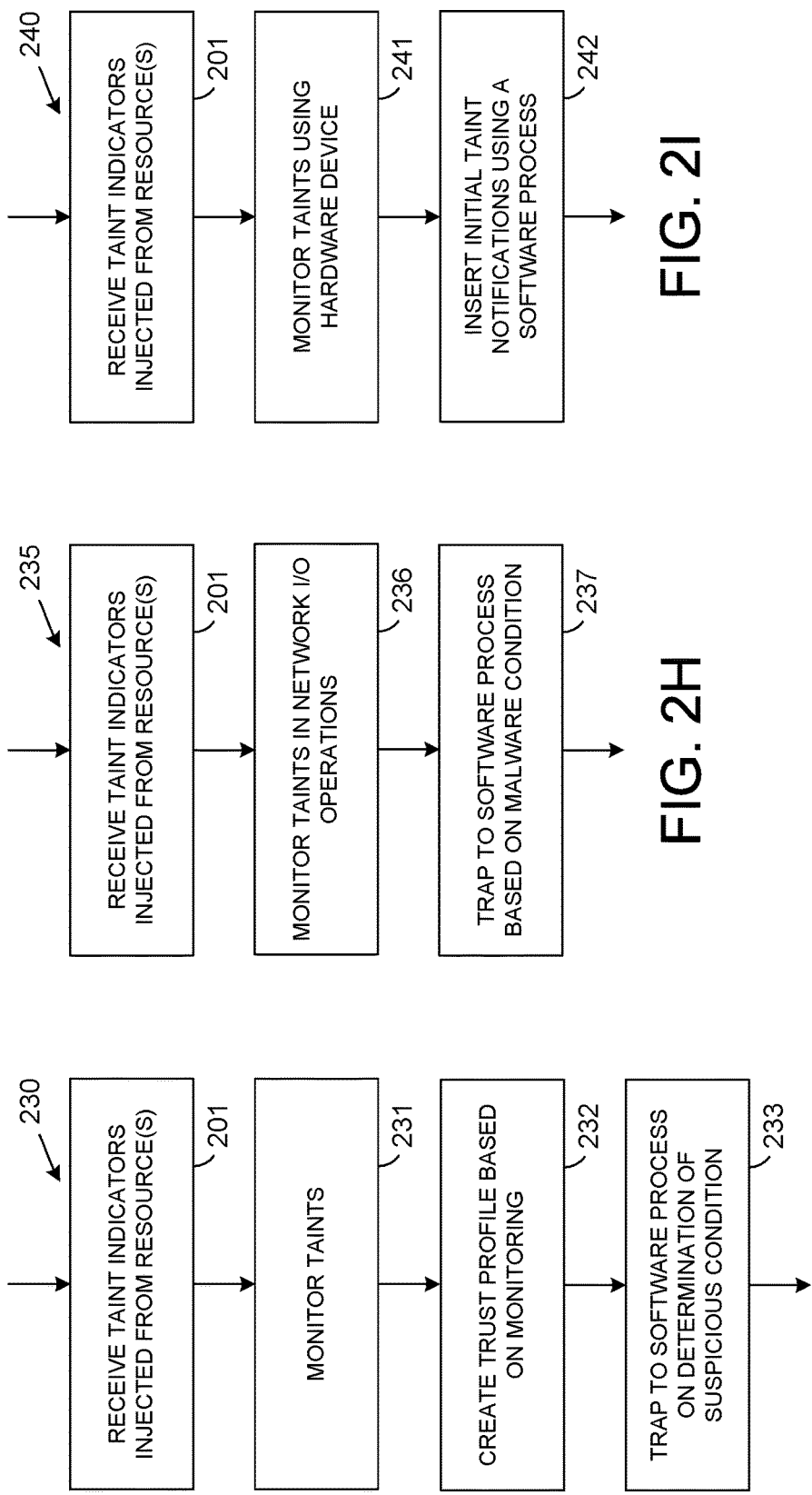

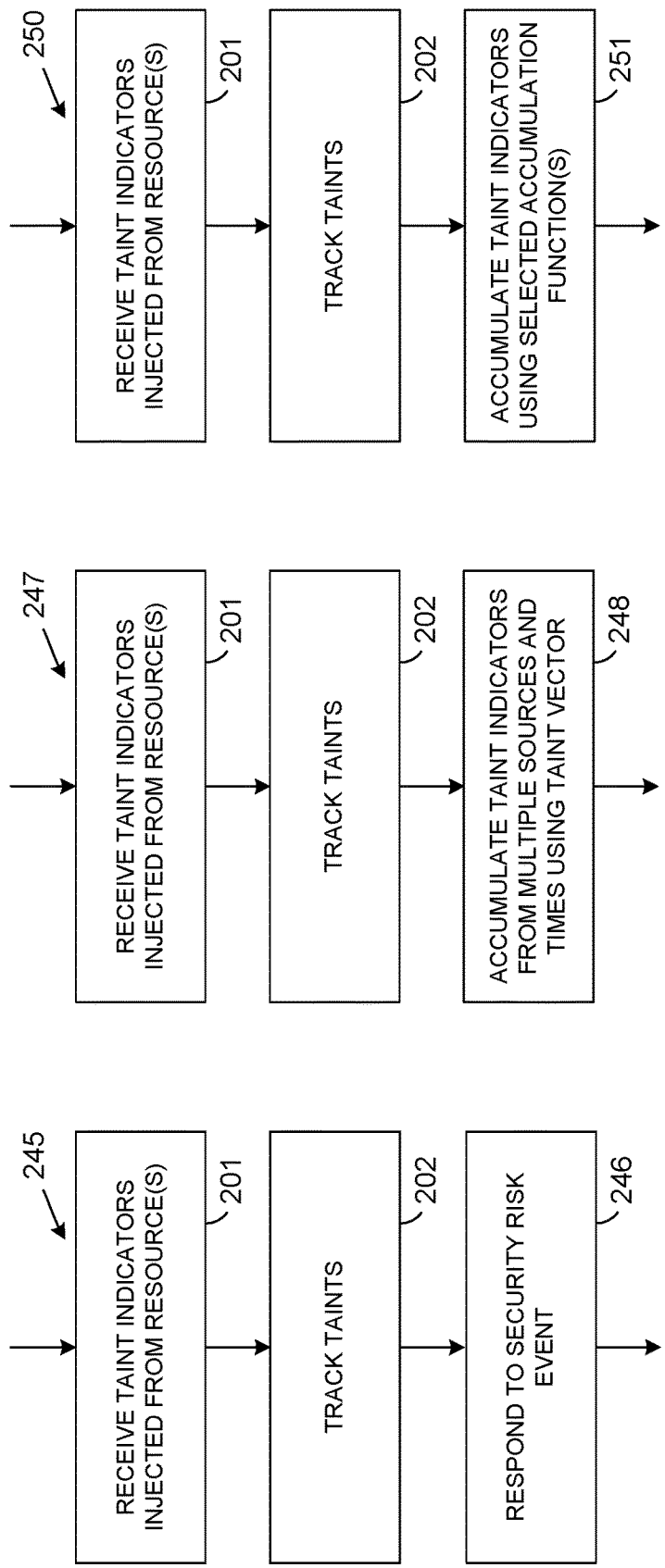

TAINT INJECTION AND TRACKING

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC §119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a continuation of U.S. patent application Ser. No. 13/373,832, entitled "Taint Vector Locations and Tracking," naming Andrew Glew, Casey Tegreene, and Dan Gerrity as inventors, filed Nov. 30, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/317,980, entitled "Conditional Security Response Using Taint Vector Monitoring," naming Andrew Glew, Casey Tegreene, and Dan Gerrity as inventors, filed Oct. 31, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/317,825, entitled "Taint Vector Locations and Granularity," naming Andrew Glew, Casey Tegreene, and Dan Gerrity as inventors, filed Oct. 28, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/317,826 entitled "Entitlement Vector for Managing Resource Allocation" filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date;

For purposes of the USPTO extra-statutory requirements, the present application constitutes a continuation-in-part of U.S. patent application Ser. No. 13/317,834 entitled "Entitlement Vector With Resource and/or Capabilities Fields," filed on Oct. 28, 2011, and naming Andrew F. Glew, Daniel A. Gerrity, and Clarence T. Tegreene as inventors, which is currently co-pending, or is an application of which a currently co-pending application is entitled to the benefit of the filing date;

For purposes of the USPTO extra-statutory requirements, the present application constitutes a continuation-in-part of U.S. patent application Ser. No. 13/200,556 entitled "Resource Allocation With Entitlement Hints" filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date;

For purposes of the USPTO extra-statutory requirements, the present application constitutes a continuation-in-part of U.S patent application Ser. No. 13/200,551 entitled "Resource Allocation Using a Library with Entitlement" filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,557 entitled "Resource Allocation Using Entitlements" filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date;

For purposes of the USPTO extra-statutory requirements, the present application constitutes a continuation-in-part of U.S. patent application Ser. No. 13/200,547 entitled "Intrusion Set Adapted for Security Risk Monitoring" filed on Sep. 24, 2011, and naming Andrew F. Glew, Daniel A. Gerrity, and Clarence T. Tegreene as inventors, which is currently co-pending, or is an application of which a currently co-pending application is entitled to the benefit of the filing date;

For purposes of the USPTO extra-statutory requirements, the present application constitutes a continuation-in-part of U.S. patent application Ser. No. 13/199,368, entitled "Intrusion Detection Using Taint Accumulation," naming Andrew Glew, Casey Tegreene, and Dan Gerrity as inventors, filed Aug. 26, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/136,670, entitled "Processor Operable to Ensure Code Integrity," naming Andrew Glew, Casey Tegreene, and Dan Gerrity as inventors, filed Aug. 4, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/136,666, entitled "Security Perimeter," naming Andrew Glew, Casey Tegreene, and Dan Gerrity as inventors, filed Aug. 4, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/136,401, entitled "Fine-Grained Security in Federated Data Sets," naming Andrew Glew, Casey Tegreene, and Dan Gerrity as inventors, filed Jul. 29, 2011, which is currently co-pending or is an application of which a currently co-pending application is entitled to the benefit of the filing date;

For purposes of the USPTO extra-statutory requirements, the present application constitutes a continuation-in-part of U.S. patent application Ser. No. 13/136,400, entitled "Encrypted Memory," naming Andrew Glew, Casey Tegreene, and Dan Gerrity as inventors, filed Jul. 29, 2011, which is currently co-pending or is an application of which a currently co-pending application is entitled to the benefit of the filing date; and For purposes of the USPTO extra-statutory requirements, the present application constitutes a continuation-in-part of U.S. patent application Ser. No. 13/136,024, entitled "Control Flow Integrity," naming Andrew Glew, Casey Tegreene, and Dan Gerrity as inventors, filed Jul. 19, 2011, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

Malicious software, also called malware, refers to programming (code, scripts, active content, and other software) designed to disrupt or deny operation, gather information to violate privacy or exploitation, gain unauthorized access to system resources, and enable other abusive behavior. The expression is a general term used by computer professionals to mean a variety of forms of hostile, intrusive, or annoying software or program code.

Malware includes various software including computer viruses, worms, Trojan horses, spyware, dishonest adware, scareware, crimeware, rootkits, and other malicious and unwanted software or program, and is considered to be malware based on the perceived intent of the creator rather than any particular features. In legal terms, malware is sometimes termed as a "computer contaminant," for example in the legal codes of U.S. states such as California.

SUMMARY

An embodiment or embodiments of an electronic device can comprise an input interface and a hardware component coupled to the input interface. The input interface can be operable to receive a plurality of taint indicators corresponding to at least one of a plurality of taints indicative of potential security risk which are injected from at least one of a plurality of resources. The hardware component can be operable to track the plurality of taints.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
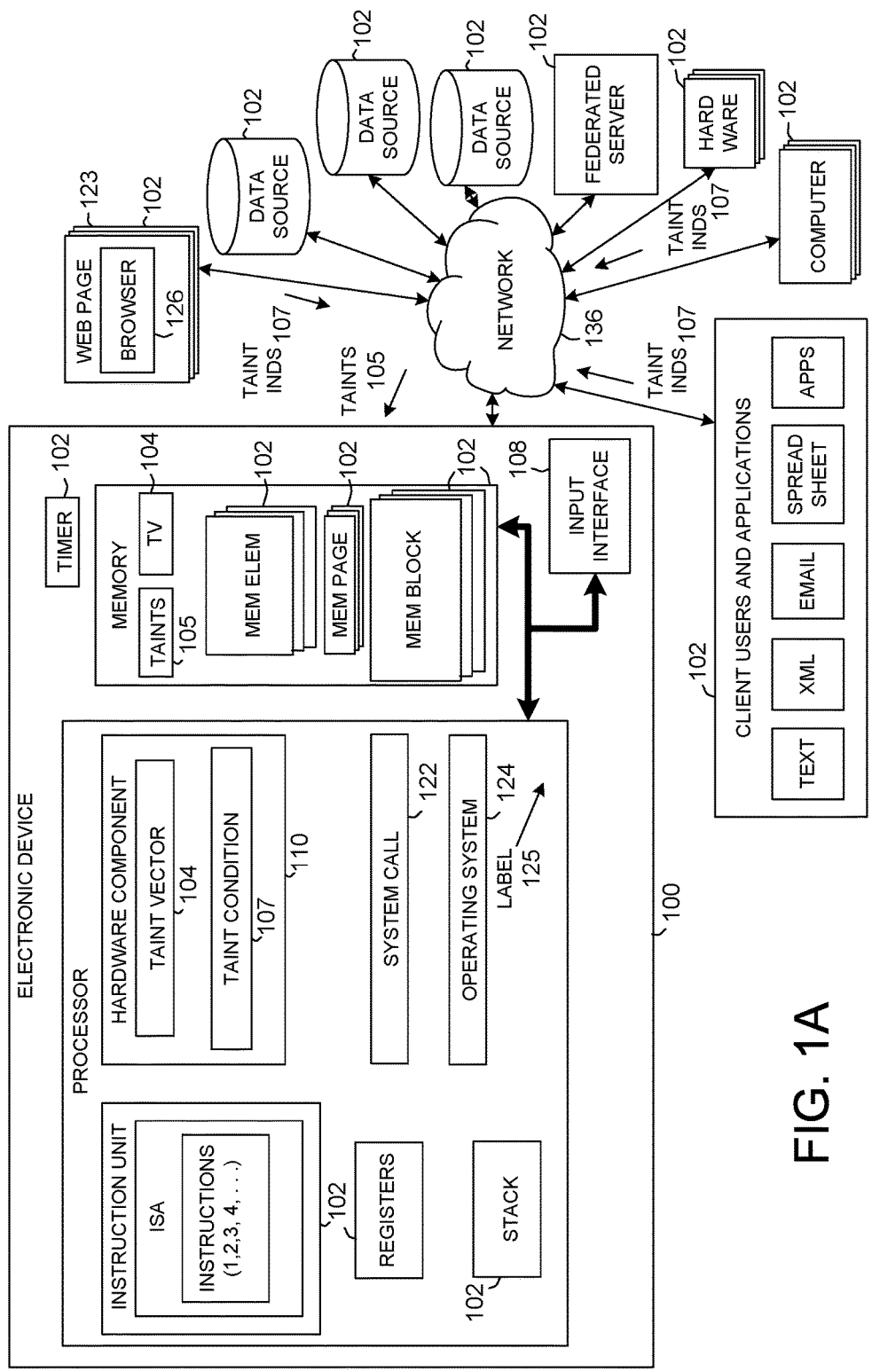
FIGS. 1A, 1B, 1C, 1D, and 1E are respectively, first, second, third, fourth, and fifth schematic block diagrams, and a graphical data description depict embodiments of a electronic device adapted to manage security risk by tracking taints and taint indications, and respond by trapping.

In various embodiments, computer systems and associated methods can be configured to include one or more of several improvements that facilitate security. One aspect can be accumulation of taint indicators to distinguish between safe and potentially unsafe data received from safe and potentially unsafe sources. Another aspect is specification and usage of a taint vector to enable monitoring and tracking of a large number of resources and conditions or a wide variety of types without burdening the system and operations with a significant amount of hardware and complexity.

Security in existing networks, systems, and computers is coarse-grained due to large granularity of native code, for example imposed by the 4 kilobyte (kb) size of a virtual memory page. Security is sought in an environment characterized by running of applications that share data with other entities. Security is coarse-grained in that memory blocks can be individually protected. For binary code or machine code, the 4 kb granularity encompasses a large amount of data in comparison to the typical 10 or 12-bit size of machine code words for which individual protection may be sought.

Another security technique can be to assign data to a particular virtual machine, which is even more coarse-grained. For example, if security is sought in the context of a browser not known to be secure, the browser can be assigned a virtual machine that runs only the browser. A virtual machine can encompass more than a CPU alone and include other components and devices such as motherboard I/O devices. The virtual machine thus can be much larger than the 4 kb granularity of memory blocks.

Security can also be sought in software or interpretive environments, for example using Java byte code or C-sharp byte code, which can be more fine-grained but at the cost of much slower performance. An interpreter can support any protection desired, even down to individual bits but is much slower than the machine code level. Performance can be accelerated only by more coarse-grained checking.

What is desired is fine-grained security with suitable speed performance. Fine-grained security is directed toward protecting memory in fine-grained pieces.

Fine-grained security can support resource allocation and resource scheduling, and can be supporting technology for hardware scheduling, virtual memory. Fine-grained security facilitates, for example, for running applications on a computer controlled and owned by another entity.

Various techniques can be used to identify the memory items to be protected including pointers such as a pointer to an object or metadata associated with a pointer, offsets, addresses, and the like.

An example fine-grained security paradigm can use metadata associated with a pointer that identifies a lower bound, and upper bound, and permissions. The pointer can be enabled to point to particular objects or even to any position within an object. Metadata can specify permissions including memory locations to which data can be written, when program code is allowed to execute, how long writing is allowed, and the like. Permissions can be associated with data objects, for example assigning a pointer to an object and, using permissions, allowing only methods belonging to that object to access the object. Another example of permissions can enable access to data, but only for specified purposes, for instance to enable a first running of an object and access allowed to only part of a routine, while preventing access by others. In another example, a particular method can be permitted to run a limited number of times or just one time, and can prevent subsequent access to data when the data has been previously exposed to an authorized reader.

Permissions can implement a concept of poisoning. For example, a user can enter a name into a text field and mark a poisoned bit that prevents subsequent branching or subroutine return (e.g. the software managing the form can set a poison or taint bit). The poisoned bit can function as a dirty bit which indicates whether an item such as an object, memory, or other resource is dirty, which prevents predetermined purposes or actions to the item, for example preventing actions applied to a data block or object, such as not allowing return (e.g. not allowing execution of the data bytes entered by the user as code, such as is done by stack smashing attacks) In some implementations, the poisoned (or tainted) bit may be used to track which sensor provided which data, for example, for security reasons, for billing reasons, or for any other suitable reasons.

An illustrative computer system can be configured for fine-grained security as supporting infrastructure in a concept of federated sharing and federated data sets. Sensor fusion involves fusing of data and data sets in numerical aspects and permissions aspects, wherein data and data sets are fused in conditions of a first entity owning or controlling a first sensor and a second entity a second sensor.

Fine-grained security can be implemented in an infrastructure can be implemented in an architecture including servers and clients. For example, gaming code servers and gaming console clients can interact by running program code that executes in part on machines controlled by the server and in part on machines controlled by the client. Fine-grained security enables the interaction to be mutually trusted by both sides.

Fine-grained security can be configured to exploit existing infrastructure aspects such as the Trusted Platform Module (TPM) which is installed in computer systems somewhat universally but little used in practice. TPM generally includes secure storage for keys but little or no security logic, certainly not enough to implement fine grain security.

In some embodiments, a servers and clients architecture can implement fine-grained security using one or more server downloaded modules. For example, a gaming code server can transfer a server downloaded module that executes on a client. Fine-grained security can be configured to allow downloaded modules to execute securely, for example to ensure isolation in software, and further configured to prevent physical attacks for example via a device such as a logic analyzer on the bus reading sensitive information.

Some system embodiments which support fine-grained security can be activated at boot-strap loading of a computer, for example via microcode executing in the processor. At boot-strap loading, fine-grained security can perform various security operations such as inspecting software version and possibly microcode, ensuring viability of software, for example by creating and applying a hash to each level of code (microcode, firmware, software, and the like), checking against previously run code, signing-off on viability if warranted, and printing a signature of executing code to enable determination of trust.

Fine-grained security operations can further include building or creating a chain of trust, checking each part of operation beginning with TPM, then checking security during operating system functions, downloading of modules, and execution of procedures. In an example configuration, fine-grained security can perform checks of operation system functions which, to the first order, control all operations.

An example of chain of trust can begin with trust of an operating system (for example by an association such as Motion Picture Association of America (MPAA), International Game Developers Association (IGDA), and the like). If the operating system is certified and fine-grained security operable under the certified operating system ensures that the system is not hacked, the chain of trust is established since the operating system prevents user code from accessing downloadable code.

Weaknesses of the chain of trust can be that the process is too linear and easy to break since a single-point of failure breaks trust. Chain of trust also has problems ensuring privacy.

An extension that can improve chain of trust is a late-secure boot which is run later than a typical bootstrap load and can involve security checking in an operating system that is not yet trusted. At running of the late-secure boot, a security initialization is run which starts security process booting in a system that is already running.

A more secure concept of security can be a web of trust. The web of trust can have multiple trust levels which hand trust to the operating system. At each trust level, software can validate code in a stack of code to establish trust. In the web of trust, a failure at some point can be rechecked according to one or more alternate paths (e.g. in some implementations, byzantine agreement protocols can be used which form a set of protocols to establish trust). The operating system can use pathfinding or agglomerated trust protocols to analyze trust at each level to enable multiple levels or types of trust validation.

Intrusion detection can be an aspect of fine-grained security.

Intrusion detection can use the concept of poisoning. Poisoning can be used for protection, for example in the case of sensor data or a sensor controlled by an untrusted entity. One or more bits can be allocated to identify aspects of the target sensor and data. Poisoning can be data-defined or entity-defined.

A system can enforce security via accumulation which can be used to quantify poisoning, for example by accumulating multiple indicators of lack of safety or "dirtiness." Accumulation can be operable to accumulate on a per-location basis, per-data basis, overall, or any selected combination. Accumulation can be used to quantify whether data from a particular source or entity can be trusted, rather than to detect security attacks per se.

A taint technique can be used to distinguish between safe and potentially unsafe data received from safe and potentially unsafe sources. The term "taint" can be defined as potentially unsafe data or data received from a potentially unsafe source. Unsafe data and/or sources are untrusted as potentially dangerous, malicious, or suspect according to a predetermined security policy. In general, "taint" need not be purely negative (e.g. one might taint sensor data so as to know which provider of sensor data should be given credit if used). Security criteria of tainting can be specified independently for various applications, conditions, and/or implementations ranging, for example, from a source, data, and/or resources via which the data is transmitted that are not known to be completely trusted to those known to have positive confirmation of ill-intent, malice, or compromised security attributes. In some implementations, analysis of the data itself may contribute to taint characterization.

Accumulation enables analysis of a particular sensor which is not untrusted as fundamentally faulty or inherently dishonest but rather imperfect to some degree, for example with a signal to noise ratio that allows some errors. Thus, data may be trusted overall or over time, but possibly an individual bit may not be trusted. Accumulators can gather taints up to a predetermined threshold, after which an action may be taken. A taint can arise from software, can be forwarded from an original source, may result from an attacker attempting to break into a web browser, or may be "operational" for null pointers, buffer overruns, and other faults. In various embodiments and/or conditions, accumulation may be per source, overall, or both. One or more bits can be accumulated per untrusted source. The accumulation can be configured to be subject to various selected algorithms, for example power law, race functions, and the like.

In a power law algorithm, the frequency of a security risk event is presumed to vary as a power of some attribute of the event. The power law relationship is believed to apply to distributions of a wide variety of physical, biological, and man-made phenomena such as sizes of geophysical and weather events, neuronal activity patterns, frequencies of words in various languages, and many other examples.

In a race function, a security risk event is presumed to follow exponential or geometric change, either growth or decay, wherein the rate of change of a mathematical function is proportional to the function's current value.

An accumulator can be configured using any suitable arithmetic or logic element, and can accumulate data in any suitable manner, such as a counter or bit per source, a bit per accumulator. The accumulator can be configured to address information from different sources and at different times in selected distinctive manners. For example, an accumulator can be set so that 99% correct data is sufficient and a clean bit indicated despite occasional errors, while data from another source may be known to be valid only 65% of the time wherein a selected algorithm can be run, for example power law, race function, or the like, to determine validity.

On the specific case of sensor, some errors occur because sensors aren't perfect, a signal to noise characteristic is present so some errors will occur, even in the case that data is usually correct 99% of the time. Thus, the data can be generally trusted cumulatively with some level of trust to individual bits. An entity that is not trusted will have outlier in terms of error rate, not criteria per error rates. In some circumstances one definition of trusted/untrusted can be specified or tracking can be done on source and data basis. In a federated system, tracking can be on the basis of the sensor of one entity against another entity.

Various other accumulator examples can be implemented. A counter per affiliation can be defined wherein a low level is merged up to a higher level. Pathways to a system can track sources of data through a system such as by running data through a specified pathway through a "validator," a software program or hardware logic used to check the validity of multiple taint indicators in terms of security risk. A 2-4-bit counter can be used to track one-bit per source or a counter per source.

Tainting can be performed on a one-bit basis for a small number of sources which can be federated down to whatever sources are desired. An accumulator can be configured to count the number of taints, such as the taints per memory unit (per byte for example). Statistics can be performed on any suitable taint counter—a counter per bit, 2-bit counter, 4-bit counter and the like. Examples of taints and/or events to filter can be used for taint monitoring and creation of a trust profile and include: instructions tainted, the number of tainted instructions, the number of instructions written as a result, the number of data loads and stores, the number of data memory accesses, outputs, calls/returns, branches (for control flow), integer overflows, network I/O, and the like. An integer overflow can be handled as a taint. Integer overflows occur frequently and can be legitimate about half the time, and thus a condition indicating possible error but by no means certainty of error.

Monitoring of network I/O is useful for detecting when a virus attempts to call home. The system can trap to software if any specified taint occurs, a simple reaction for any suspicious event.

Accumulators can be used to build a trust profile over time, such as by using taint information as raw data for creating the trust profile. The trust profile can be used to lower and raise the trust level over time, and to make subsequent decisions. For example, a bit or counter can decay over time to balance race with accumulation.

Any suitable comparisons can be defined for particular conditions. In an illustration, a trust profile of an I/O process can be built over time. In a simple control scheme, a high-risk operation can be monitored so that if the number of taints is greater than a predetermined threshold, I/O can be blocked. Over time, the count can be decremented to account for spurious events.

Suspicious activities can be monitored using comparisons, for example using a counter or a single-bit designating suspicious events. Examples of suspicious activities can include null pointer references which are not always intentional or malware, buffer overruns/overflows which are usually untrusted, repeated attempts to access a key, and the like.

Comparisons can be used to efficiently track suspicious activities, particularly in conditions that complex statistical analysis is unavailable or unwarranted.

A taint vector, operable as an intrusion detection system, can be created for tracking multiple events or conditions. An example taint vector can comprise 16-64 bits corresponding to associated sources, events, conditions, and/or suspicious activities. Each taint vector of a composite vector may correspond to a source of data or a type of activity. Taint vectors enable monitoring and tracking of a large number of resources and conditions or a wide variety of types without burdening the system and operations with a significant amount of hardware and complexity. The taint vector can include a various decay options tailored to the particular information monitored. For example, the taint vector can decay after a certain number of operations to avoid triggering on outlying events. Possibly schemes for implementing decay can include: 1) increment/decrement using a single vector which is incrementing and decrementing is performed on the same vector, 2) copying the vector to memory periodically to maintain on old version while continuously incrementing and decrementing to enable restoration of the old version subsequent to reacting to an invalid or error condition, and 3) impose a decay that is a race of decay versus accumulation.

A taint vector can be configured to introduce a new class or type of security element, not taints but rather suspicious activities including null pointers and buffer overflows. Suspicious events are taints or can be treated and propagated like taints.

The taint vector can be tailored to monitor various comparisons including, for example: are any elements greater than threshold, are all greater than threshold, is the sum of all or some elements greater than threshold, is the sum greater than an intermediate value, and the like. The system can trap if the taint vector meets predetermined conditions.

The taint vector can be considered an accumulator of faux pas, for example null pointer references, attempts to access a secure part of the CPU, buffer overruns (a common hacking technique). The taint vector can be used to monitor events or conditions that are not necessarily attacks or failures but may be innocent or coincidental, but originates in a region that raises suspicion, wherein a feature of the region can raise or lower suspicion. A taint vector can be configured to focus more on the type rather than origin of malicious event or condition that occurs. The taint vector can include primary and secondary criteria, and accumulates suspicious actions while also considering indicial of levels of suspiciousness including extra data and extra identifiers relating to the actions for further analysis. Accordingly, although the taint vector can consider the source of an event or condition in determining suspiciousness, actions, consequences, and usage can be more pertinent to identification of an attack or malicious condition. For example, known system calls are associated with reading data off web pages and thus tagged as suspicious for further analysis in which the source of the system calls can be identified (for example via operating system software that injects a label identifying the source).

The taint vector can be configured to set a hierarchy of suspicion based on the source, type, or identify of an event. For example, a buffer overrun can be considered worse than a null reference. The source of the event can be considered to assign a level of suspicion such as whether the sensor from a known and trusted bank or an unknown bank or foreign hack site.

Information can reach the taint vector from multiple various sources. For example, some system calls are associated with accessing information from web pages. These calls are tagged and the operating system injects a label indicating that the data originated from a web browser at a particular identified site. The protocol for receiving a taint notice for tainting originating in a remote system outside the system which controls the taint vector can be that the taint notice is placed by software as some level, possibly software in the remote system. The taint notice is received from software from various sources such as by forwarding from the originating source, determined by a person attempting to write to a web browser, originating from suspicious operations or faults (such as buffer overflows), and, generally, from an indication that data has some level of questionability.

The taint vector can be implemented to include tolerances set based on questionability of the source or event. Zero tolerance can be set for particularly suspicious or harmful events and/or sources wherein a single event can result in a maximum response. For a low threshold, the response for one taint can result in a trap, exception, or shutdown, and may be used, for example, in nuclear power plant control.

A medium threshold can be a hybrid of low and high threshold and call for a medium response and include aspects of decay. An illustrative setting for medium threshold may allow two taints per hour and thus have decay of one taint per half hour. In a typical condition such as one buffer overflow per X amount of real time or CPU time or other interval, a monitor tracks events. Decay is implemented to account for rare and spurious events that are likely to occur by chance when monitoring continuously for vast time spans, and do not surpass threshold for an error condition. Decay is thus is imposed upon accumulation so triggering occurs when more events per unit time (other interval, instruction cycles, and the like) than accommodated by decay are indicative of an error condition. If events occur too often, the threshold of rate of occurrences indicative of suspiciousness (taint rate) is too high and the threshold can be reset.

An example of high threshold can allow twelve taint counts per unit time such as for cheap video forwarded from a provider or signals from ubiquitous cell phones. Most events can be ignored in the absence of some indication of attack. Thresholds are set to balance a sufficient level of security with communications characterized by large amounts of data and frequent errors.

If taints exceed the threshold, then suspicion if sufficiently great that some action or response is taken. A suitable response can be trap, exception, notification, alarms, and the like.

In various system embodiments, taint vectors can be configured at selected locations and with selected granularity. A simple system can have a single taint bit. A slightly more complex system can have a single taint vector allocating multiple entries. Additional control and functionality can be attained by assigning a taint vector per register, for example to track computer processor register EAX (in 32-bit Intel Architecture IA-32) while not tracking register EBX.

A taint vector can be configured to track memory taints, for example tracking every byte in a computationally and resource expensive arrangement. In contrast, a less extensive implementation can assign a single taint for all memory such as with 64 entries. A vector of 64 entries may have one bad indicator operable as a running gauge of operations. The taint vector can indicate on/off status or a range.

Taints can be allocated by memory page. This might be challenging for some existing processors, such as Intel processors, since no free bits are available and page tables are read-only. To address this challenge, a system can include a memory taint hash table which, if read-only, can indicate a level of taint per memory block. A read-only memory prevents logging of taints in memory so that the table is located outside of the read-only memory. The amount of memory for the table can be reduced by using a hash. Memory at the hash of an address can be used to compress the address, for example 4 gigabytes (GB) can compress to a 64-kb table. A special instruction can be specified in which store memory at a specified address receives a predetermined value.

Taints can be allocated by byte to attain the finest possible granularity. A special instruction can be specified in which memory at a specified address has a taint field equal to a predetermined taint field value. Another example special instruction can be specified to create a taint hash vector in which memory receives a specified hash of the address where the hash is operable to compress the address, for example 4-GB of memory can be compressed to a 64-kb table. Once the hash is performed, security is no longer determinant or precise so that false positives can occur. The false positives can be addressed using intrusion detection capabilities of the system. The taint hash vector is costly in terms of resources, possibly 1-2 bits per byte maximum—a substantial amount of overhead.

A taint vector can be configured to segregate memory by type, for example distinguishing memory for storing program code from memory for storing data. Different types of segments can be allocated for corresponding different granularities of taint information.

Taints can be allocated by hardware process identifier (PID). For example, one vector can be allocated per hardware thread to address context switching wherein a software thread's vector is stored.

In another option, taints can be allocated wherein a cross-thread taint is enabled, for example to address some system-wide taint.

In various embodiments, the operation of tainting can be allocated among hardware devices and components and software. In a particular embodiment, hardware can track taints while software can inject initial taint notifications, except when hardware can determine a priori that an event or operation is bad. In example functionality, hardware can generate a trap to software according to predetermined "trap-if" rules that are most suitable selected so that rules are simple and easy to describe, are activated in response to a specific condition, and easy to implement. A trap can be activated based on selected threshold conditions.

In various system embodiments, taint vectors can be configured with selected decay and using selected decay mechanisms. Decay can be applied periodically for example either on a consistent basis or with a varying period based on a sensitivity meter. Characteristics of the sensitivity meter such as rate of subtraction can be selected based on the environment of a system, for example whether a computer is running on a home network, a business environment, a public network, and the like.

Decay methods can include subtraction of selected number N or shifting the taint vector in an interval of time, instruction count, or other suitable metric (time periods, processor frequency or cycles, and the like). The decay parameter and rate can be programmable. The rate and/or period can vary with the sensitivity meter, also possibly in a programmable manner, based on conditions such as type of network (home, public, work), activity (gaming, web browsing, office or scientific applications), and other conditions, for example multiple taints from a known particularly untrustworthy source. The rate and/or period can also vary according to hardware environment or perspective, for example whether the hardware is constrained to a fixed rate or enabled for a programmable rate such as via a register loaded by software with pertinent information.

A special instruction can be created to facilitate setting of the sensitivity meter. The instruction can operate in conjunction with the operating system to read a register indicating the level of protection and can change the rate in response to operation of the sensitivity meter.

A Taint Adjustment Vector (TAV) can be formed to adjust rate and period dynamically. The TAV can comprise a timer register which can automatically decrement a set of rates. In an example of TAV operation, the TAV including one or more taint adjustment vector parameters can be applied to the Taint Vector (TV) upon expiration of the timer. In various implementations, the TAV can be applied to the TV by adding the TAV to TV, adding a delta, adding another selected value, shifting, shift-add, multiply, divide. Multiple timers can be used to enable decay for one type of information to be different from decay for another type of information. Taint Adjustment Vectors or timers can be universal over multiple Taint Vectors or per Taint Vector.

A special instruction, for example a system-level "set taint vector parameter" instruction, can be created to support the TAV. The instruction can act under operating system control in conjunction with multiple timers, each of which controls a set of taint adjustment parameter vectors (TAVs) which are used to adjust the current taint vector. The instruction can set the TAV and/or timer. The instruction can write to a control register and allocate the control register in control register space as a TAV or timer.

Another technique for delay can be recursive addition of a Taint Bias Vector (TBV) to the Taint Vector (TV), enabling the operating system to create complicated algorithms in the operating system time stamp independently of hardware operation and thus enabling flexibility in modifying, selecting, and executing the algorithms. The algorithms can generally include primitive operations such as a shift, an add, and a subtract, although any suitable operation can be performed. TBV can be larger in number of bits than TV. Bias can constrain software functionality, for example increasing or decreasing the level of sensitivity based on relatively complicated factors since the software may not be completely trusted. Bias can also constrain operation by preventing instant decay (bias may not be allowed to fully eliminate security), although the operating system can be configured to authorize or enable setting of instant decay.

In various system embodiments, taint vectors can be configured with selected taint elements to describe selected taint events.

Accidental/non-malicious overflows can be taint events. Taint handling can be constituted to handle legitimate overflows which can occur sporadically and can be expected to occur. Overflows are examples of known problems. Special instructions can be created to address such known problems. Hints can be used in association with instructions, for example by hint instructions which are dedicated to hint handling or by adding a hint bit field to an instruction. In the case of overflow, a hint can be used to notify that a particular instruction, for example the next instruction, may overflow.

Hint handling can be added to a taint vector, or to an "ignore problems" variety of taint vector. For example, a HINT instruction can be constituted that, rather than the occurrence of a taint causing accumulation of the taint vector, a count can be added to an Ignore Problems Taint Vector (IPTV).

A predictive hint can also be used to allocate resources. For example, a software routine can use a hint a prediction of a significant amount of floating point usage. A HINT instruction can be included in the routine. In another version, at the beginning of a library function, code can be inserted to enable predictive preferential scheduling. The HINT instruction can be part of the library, for example at the beginning, or associated with the library. Code can be inserted in the library, such as at the beginning of a library function requesting particular resources, for example for preferential scheduling. In one example form, a call to a system call can request the operating system to allocate more resources. In another example form, a hint instruction can be sent to hardware to implement the hint and the hardware responds by using the hint in hardware scheduling, such as push, pop, pull, stack, or the like. The hint instruction typically has no direct effect on program execution. The program will run correctly except for changes in performance and battery life.

Predictive hints can also be implemented other than with a hint instruction. Rather than an instruction, the hint may be part of the data structure. For example, X number of bits can relate to expected capabilities to which a process can be entitled such as a vector or a structure. Software can determine information for a performance descriptor, then fills in the data so that metadata of a descriptor determines importance of the performance descriptor.

Accordingly, predictive hints can be implemented in hardware, software, the instruction set architecture, or a combination of configurations. Hardware is typically more constrained than a software implementation. A software library enables the hint to be passed in a linked list of hash trees for passage into hardware, for example as a 128-bit or 256-bit register. Such an implementation can be implemented in an application programming interface (API) but sufficiently simple to be part of hardware. Thus, the API can be designed, then simplified sufficiently to put into hardware.

A taint vector can be used to simultaneously manage, monitor, analyze, and respond to taints associated with various resources independently from one another. The taint vector can be specific to particular sources and resources including networks, systems, processors, memory, hardware, software systems, virtual entities, and the like, including various aspects of operation. The taint vectors can operate on a resource pool and enable detection and resolution of various types of taints. Accordingly, the taint vectors can be used to manage security risks and faux paus of resources.

In information handling systems such as computers, operating systems, communication systems, networks, and the like, a trap, which can also be termed an exception or fault, can be invoked as a type of synchronous interrupt caused by predefined exceptional conditions such as a breakpoint, null pointer reference, division by zero, invalid memory address, and the like. A trap can result in a context switch such as a switch to kernel mode, wherein the operating system performs a predetermined action before returning control to an originating process. A trap in a system process is generally more serious than a trap in a user process, and in some systems is fatal. In some system definitions, the term trap refers specifically to an interrupt intended to initiate a context switch to a monitor program or debugger. A variety of other trap operations are possible.

Figure 1B:
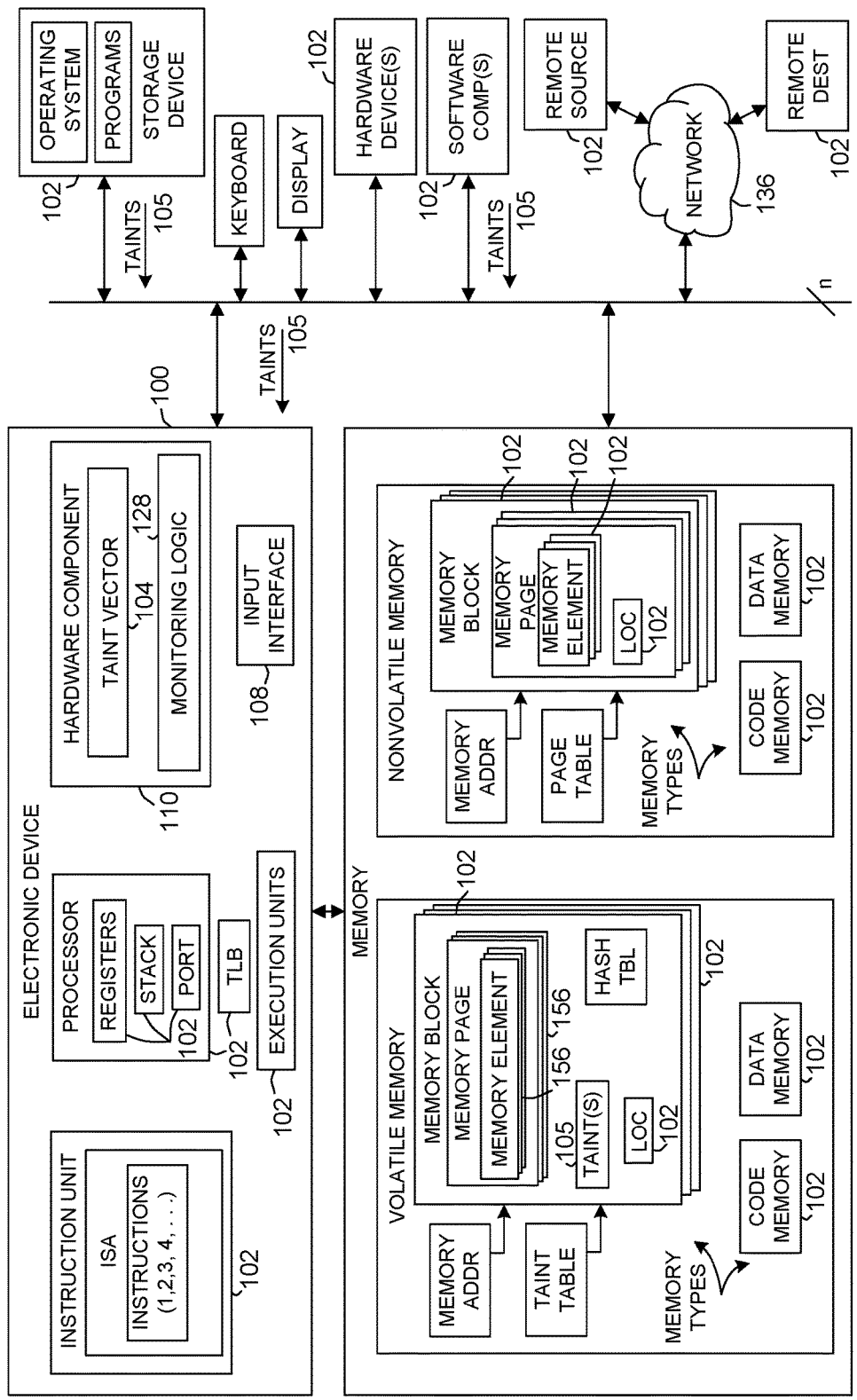

A trap can be thrown based at least partly on a current value of an entry of a taint vector. As taint vector entries are increased, a trap can be thrown based on a current value of a taint vector entry or one or more thresholds. Thresholds can vary by affiliate, current system characteristics or activities, and the like. Conditions can involve one or more comparisons between taint vector entries and thresholds. Thresholds can be entry-specific, apply to similar affiliates, be universal, be for a sum of taint vector entries, and the like. Thresholds can be set or changed to reflect different tolerance levels. A variety of target functions, weights, masks, can be implemented. Referring to FIGS. 1A, 1B, 1C, 1D, and 1E respectively, first, second, third, fourth, and fifth schematic block diagrams depict embodiments of an electronic device 100, and can respond to predetermined taint conditions by trapping. FIG. 1F is a graphical data description showing an aspect of operation of the electronic device 100. FIGS. 1G and 1H are data structure diagrams illustrating example embodiments of taint vector 104. An illustrative embodiment of an electronic device 100 can comprise an input interface 108 and a hardware component 110 coupled to the input interface 108. The input interface 108 can be operable to receive a plurality of taint indicators 107 corresponding to at least one of a plurality of taints 105 indicative of potential security risk which are injected from at least one of a plurality of resources 102. The hardware component 110 can be operable to track the plurality of taints 105.

The electronic device 100 can be configured wherein the input interface 108 is operable to receive at least one taint indicator 107 from a tagged system call 122 associated with accessing information from a web page 123. An operating system 124 can inject a label 125 originating from a browser 126 at an identified site. In various embodiments, the electronic device 100 can be operable to respond to security risk upon determination of the at least one security risk event by a response selected from various responses such as ignoring a security risk event, logging the at least one security risk event, displaying a notification, displaying a warning message, generating an alarm, and the like. Other responses can extend beyond passing of information to dynamic management and control of system operations such as preventing a memory and/or register write, modifying operating frequency, modifying operating voltage, modifying an operating parameter, performing a system call, and the like. Even more drastic responses can terminate a particular process, and end operations of some or all resources, for example by calling a trap and/or exception, terminating operation of selected resources, activating a system shutdown, and the like.

In various embodiments, tainting can be distributed among hardware devices and components and software. In a particular embodiment, hardware can track taints while software can inject initial taint notifications, except when hardware can determine a priori that an event or operation is bad. Accordingly, the electronic device 100 can be constructed such that the hardware component 110 is operable to inject at least one taint 105 of the plurality of taints 105 when the at least one taint 105 is known a priori to indicate an event 116 and/or condition 120 is suspicious.

The systems and techniques disclosed herein are operable in the context of physical hardware and software-oriented configurations. The systems and techniques are further operable for embodiment as virtual computers and devices presented or emulated within a virtualization system. Thus, the electronic device 100 can be used in physical hardware systems, virtualized systems, and combination systems with both physical and virtual aspects, with functionality distributed across devices or systems. Thus, taint information can be received from a source remote from a targeted system, such as from an interface, a network, a gateway, remote computer, or the like.

Taint information can be received from some source and can be destined for some target storage location and downstream usage. Information or data can be considered tainted, potentially tainted, suspect, or known untainted based on multiple criteria. Tainted information or events are defined according to a particular implementation and security policy in a range from "of interest," potentially untrusted, and suspect to untrusted, potentially dangerous, and malicious. Information can be considered tainted based on entity including source, target, and interface; and also based on characteristics or conditions of information receipt such as conveying protocol or transaction; or based on a combination of considerations.

In various embodiments, the electronic device 100 can handle taints of various types. For example, the electronic device 100 can be configured such that one or more of the plurality of taints can be selected from among null pointer references, attempts to access a secured part of a processor, attempts to access a secured resource, buffer overruns, events originating in a region that raises suspicion, faults, integer overflow, multiple taint indicators that exceed at least one predetermined threshold, a taint indicated by power law analysis, a taint indicated by a race function, attempts to access a key, and many others.

Another aspect of electronic device operation is specification and usage of a taint vector 104 to enable monitoring and tracking of a large number of resources and conditions or a wide variety of types without burdening the system and operations with a significant amount of hardware and complexity. For example, referring to FIG. 1B, the electronic device 100 can further comprise at least one taint vector 104 and monitoring logic 128. A taint vector 104 can be operable to track at least one taint 105 of the plurality of taints 105 indicative of potential security risk originating from at least one of the plurality of resources 102. The monitoring logic 128 can be operable to monitor the at least one taint vector 104 and detect a predetermined taint condition 106 wherein a predetermined condition of data is indicated.

In some embodiments, the monitoring logic 128 can be operable to increment the at least one taint vector 104 upon detection of a predetermined taint condition 106 wherein a predetermined condition of data is indicated.

In various embodiments, the electronic device 100 can be constituted to implement a wide range of accumulation functions. For example, the electronic device 100 can comprise monitoring logic 128 operable to accumulate the plurality of taint indicators independently using one or more of a plurality of accumulation functions 140. The accumulation functions 140 can be selected from among comparing ones of the accumulated plurality of taint indicators to at least one predetermined threshold, performing power law analysis, and/or performing a race function. The electronic device 100 can be formed such one or more of the taint vectors can be operable as an accumulator for counting the number of tainted instructions. Other suitable accumulation functions can operate by counting various occurrences or aspects of operation such as counting a number of taints, counting a number of taints taintsper memory unit, counting a number of instructions tainted, counting a number of tainted instructions, counting a number of instructions written as a result of a taint, counting a number of data loads and stores, counting a number of memory accesses, counting a number of calls, counting a number of returns, and counting a number of branches. Still other counting aspects of accumulation functions can include counting the number of integer overflows, counting the number of network input/output events, counting the number of null pointer references, counting the number of buffer overruns/overflows, counting the number of repeated attempts to access a key, and the like. Suitable accumulation functions can be used to monitor any aspect of operation.

In some embodiments, one or more of a plurality of accumulation functions 140 can be implemented via a taint vector 104. Thus, the electronic device 100 can be configured wherein ones of the at least one taint vector 104 can be operable as an accumulator of a plurality of taint indicators 107 indicative of potential security risk from a plurality of distinct sources 115 at distinct times.

In various embodiments and/or conditions, the electronic device 100 can be configured to address intrusion for a variety of resources 102 at a variety of levels of granularity. For example, the electronic device 100 can be operable to configure bit fields of the taint vector at a selected granularity including a taint bit per entry, a taint bit per register, a taint bit per multiple entries, a taint vector per entry, a taint vector per register, and a taint vector allocating multiple entries. Furthermore, in various embodiments and/or conditions, the electronic device 100 can comprise monitoring logic 128 which is operable to allocate taints at a selected granularity. The various levels of granularity can include allocating taints by memory page, allocating taints by byte, allocating taints by word, allocating taints by memory block, and allocating taints by hardware process identifier (PID). Other levels of granularity can include allocating taints to enable a cross-thread taint, allocating taints among hardware devices, allocating taints by component, allocating taints by software component, and the like.

In some embodiments, for example as shown in FIG. 1H, the electronic device 100 can be configured wherein the monitoring logic 128 is operable to acquire and monitor a history of the ones of the at least one taint vector 104 in a feedback loop 142 that correlates taints 105 with responses to the taints 105.

Several target functions, weights, masks, can be implemented for tracking and responding to taints. For example, embodiments of the electronic device 100 can further comprise monitoring logic 128 operable to apply at least one function 144 to the at least one entry 103 of the at least one taint vector 104.

In various embodiments, the electronic device 100 can be configured wherein the at least one function 144 can be selected from various functions such as weights, masks, sums, combinations, arithmetic functions, logical operations, transforms, and the like.

Taints can be generated on the basis of questionability of the data and of other aspects of operation and condition such as prior negative experience or lack of familiarity with a data source or entity. For example, the electronic device 100 can be configured to include monitoring logic 130 which is operable to determine whether information from a particular source or entity is trusted based on assessment of security risk. Thus, in a further aspect of operation, shown in FIG. 1B, embodiments of the electronic device 100 can further comprise monitoring logic 128 operable to acquire a history of the ones of the at least one taint vector 104.

In various embodiments, the monitoring logic 128 can be constituted to perform various tracking and monitoring operations to enable enhanced detection of intrusion. For example, in some embodiments the electronic device 100 can be configured wherein the monitoring logic 128 is further operable to track taint indicators 106 characterized by a range of taintedness from potentially suspicious to definite taints 105.

The monitoring logic 128 can be constructed to perform various comparisons to indicate error or intrusion. For example, the electronic device 100 can be configured wherein the monitoring logic 128 is further operable to monitor comparisons selected from a group including determining whether any elements are greater than a predetermined threshold, determining whether all elements are greater than a predetermined threshold, determining whether the sum of some elements is greater than a predetermined threshold, determining whether the sum of all elements is greater than a predetermined threshold, and the like.

The electronic device 100 can be configured to discern actual security risks from innocent and/or coincidental events. For example, in some embodiments the monitoring logic 128 can be operable to monitor the plurality of affiliates 113, system characteristics 114, sources 115, events 116, activities 118, and/or conditions 120 to detect and discern one or more potentially innocent and/or coincidental events such as null pointer references, attempts to secure part of a processor, innocent and/or coincidental events arising from a region that raises suspicion, and the like.

In various embodiments, the electronic device 100 can be operable to specify one or more of a plurality of decay options selected from applying decay after a predetermined number of operations to avoid triggering on outlying events, setting decay to account for rare and spurious events with a probability of occurrence by chance during long term monitoring, incrementing/decrementing using a single vector, and/or subtracting a predetermined number. Other suitable decay options can include shifting a taint vector 104 in an interval of time, shifting a taint vector 104 at a predetermined instruction count, shifting a taint vector 104 at a predetermined processor cycle count, copying a taint vector 104 periodically to memory to maintain an old version while incrementing/decrementing to enable restoration following an invalid or error condition, and imposing decay that balances accumulation. Further examples of suitable decay options can include applying decay periodically, applying decay with a varying period that varies based on a sensitivity meter, applying decay with a varying period that varies based on environment, applying decay with a varying period that varies based on activity type, applying decay according to a programmable parameter at a programmable rate, and the like.

Figure 1C:
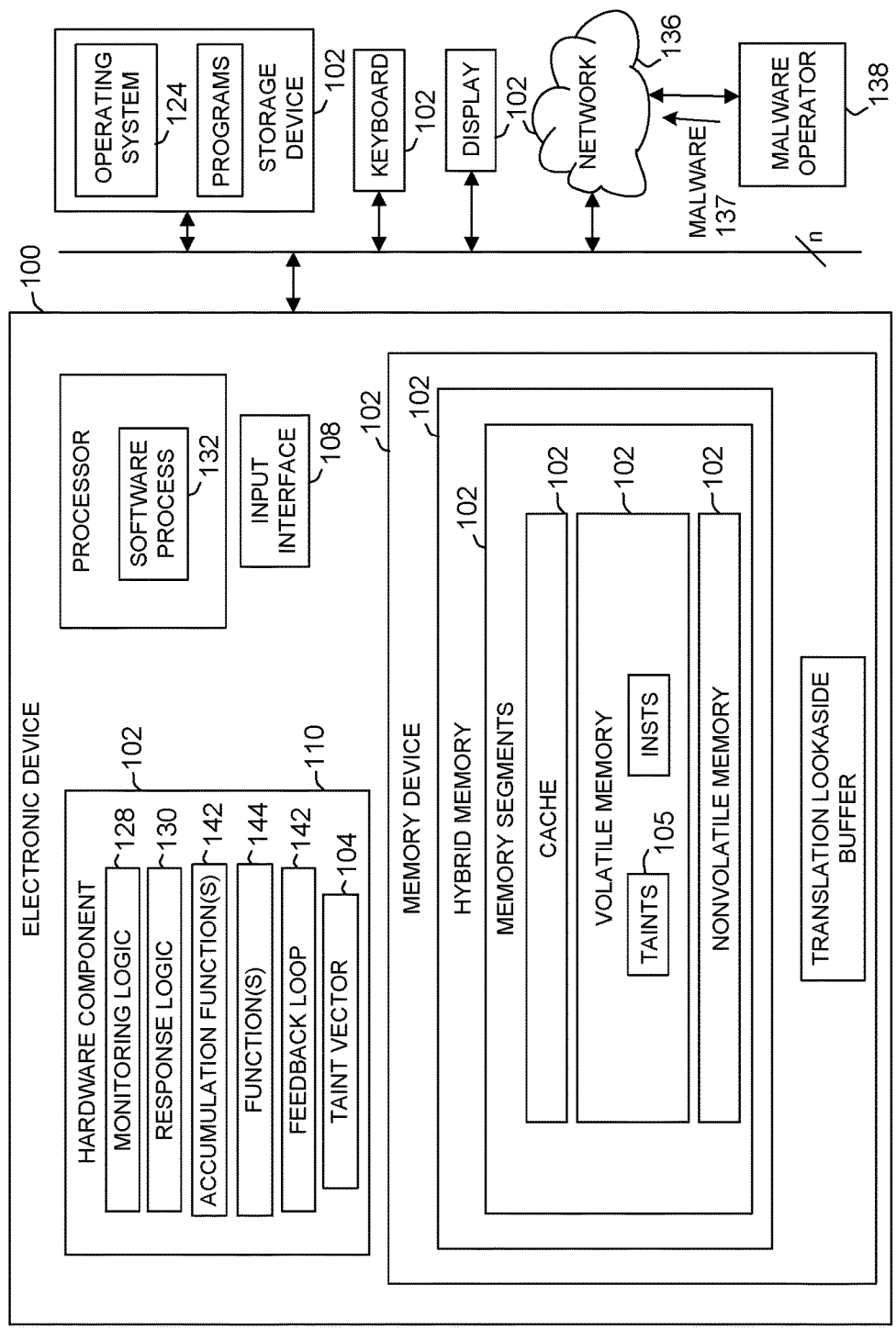

In some embodiments, as depicted in FIG. 1C, the electronic device 100 can include response logic 130 to respond to a taint condition determined during taint vector tracking. Hence, the electronic device 100 can further comprise at least one taint vector 104 and response logic 130. The at least one taint vector 104 can be operable to list at least one taint 105 of the plurality of taints 105 indicative of potential security risk originating from at least one of the plurality of resources 102. The response logic 130 can be operable to respond to a predetermined taint condition 106.

For example, the monitoring logic 128 can monitor network communication traffic and response logic 130 can respond to tainted traffic on the network. Accordingly, the electronic device 100 can be configured to further comprise monitoring logic 128 operable to monitor taints 105 in network 136 input/output operations, and response logic 130 which can be operable to trap to a software process 132 based at least partly on determination of a network 136 input/output condition of an attempt of malware 137 to communicate to a malware operator 138.

In some embodiments and/or conditions, the electronic device 100 can further comprise monitoring logic 128 operable to monitor taints 105 using a hardware device 109, and response logic 130 operable to insert initial taint notifications using a software process 132.

In various embodiments, applications, and/or conditions, the electronic device 100 can respond to security risk upon detection of a security risk event using one or more responses selected from responses that range from relatively minor informational actions to actions which can moderately or substantially change system operations, or even terminate some or all system operations. Accordingly, some embodiments of the electronic device 100 can further comprise response logic 130 operable to respond to at least one security risk event with at least one minor response selected from among ignoring a security risk event, logging the a security risk event, displaying a notification, displaying a warning message, generating an alarm, and the like. When limited intervention is warranted, the response logic 130 can be operable to respond to at least one security risk event with at least one limited intervention response selected from among preventing a memory and/or register write, modifying operating frequency, modifying operating voltage, modifying an operating parameter, performing a system call, and the like. For security risk determined to be more serious, the response logic 130 can be operable to respond to at least one security risk event with at least one system intervention response selected from among calling a trap and/or exception, terminating operation of selected resources, activating a system shutdown, and the like.

Figure 1D:
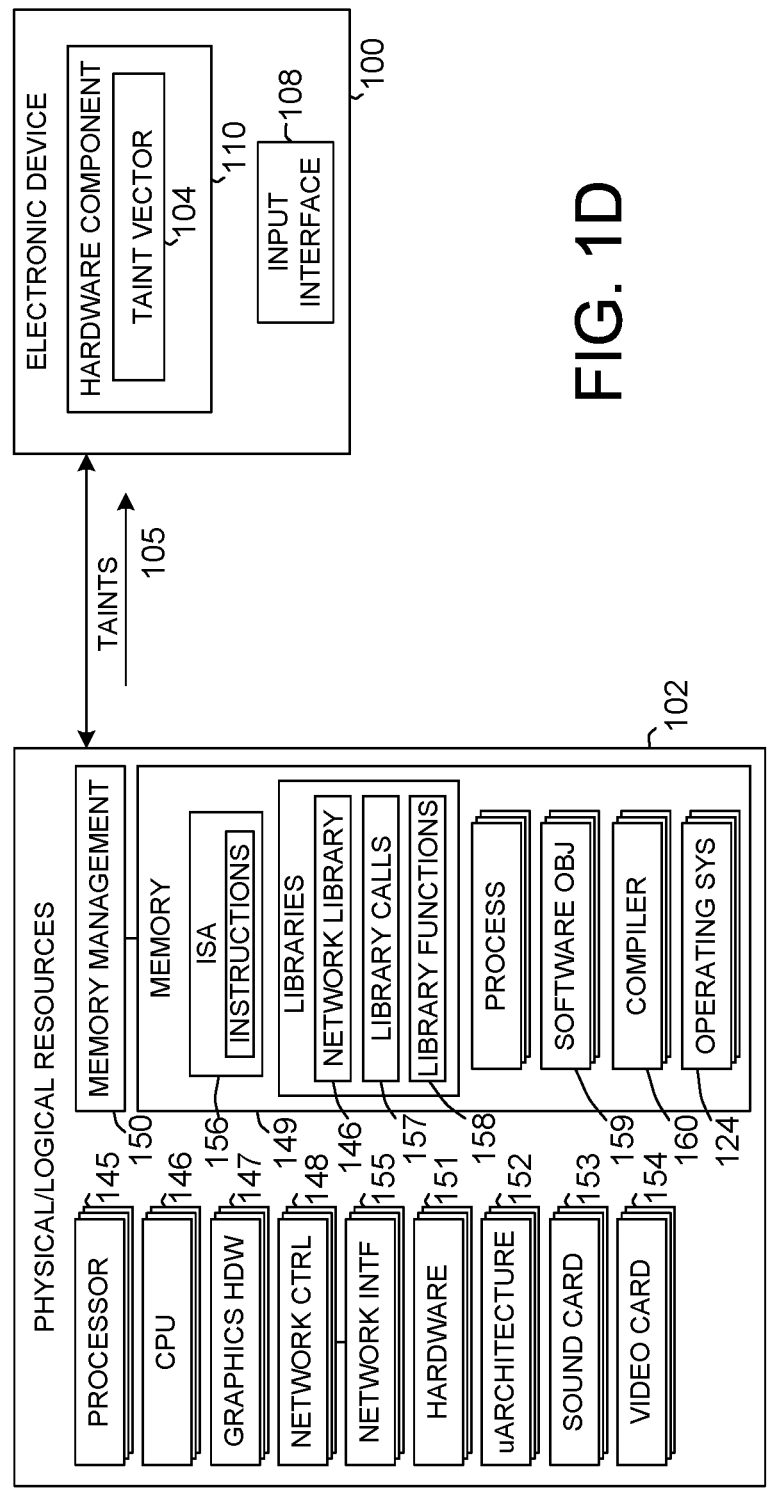

Referring to FIG. 1D, embodiments of the electronic device 100 can be configured wherein the plurality of taints 105 can be injected by selected ones of the plurality of resources 102 including physical and/or logical instances of processors 145, central processing units (CPUs) 146, graphics hardware 147, network controllers 148, memory 149, memory management 150, hardware 151, microarchitecture 152, sound cards 153, video cards 154, network interfaces 155, instruction set architecture (ISA) 156, library calls 157, library functions 158, software objects 159, compilers 160, operating systems 124, and the like.

The electronic device 100 can be operable as at least part of a networked system including multiple computing devices such as electronic device 100 which interfaces with remote and potentially untrusted computers and may be the source of security risk events such as attacks. Security risk events or attacks can arise from other sources including computing devices and systems, storage and devices inside a firewall or local to a targeted machine. In general, computers and networks can represent a variety of local or globally distributed systems and networks that can supply information via a plethora of communication channels and protocols such as the Internet.

Security risk events and attacks can originate remote from a local and potentially trusted network, and can similarly originate from local users, systems, devices, and storage. Accordingly, the electronic device 100 can be constituted to address security risk events that arise from a local device such as keyboard, network interface, communication devices, local storage including memory and long-term storage devices, and other computers and systems.

Figure 1E:
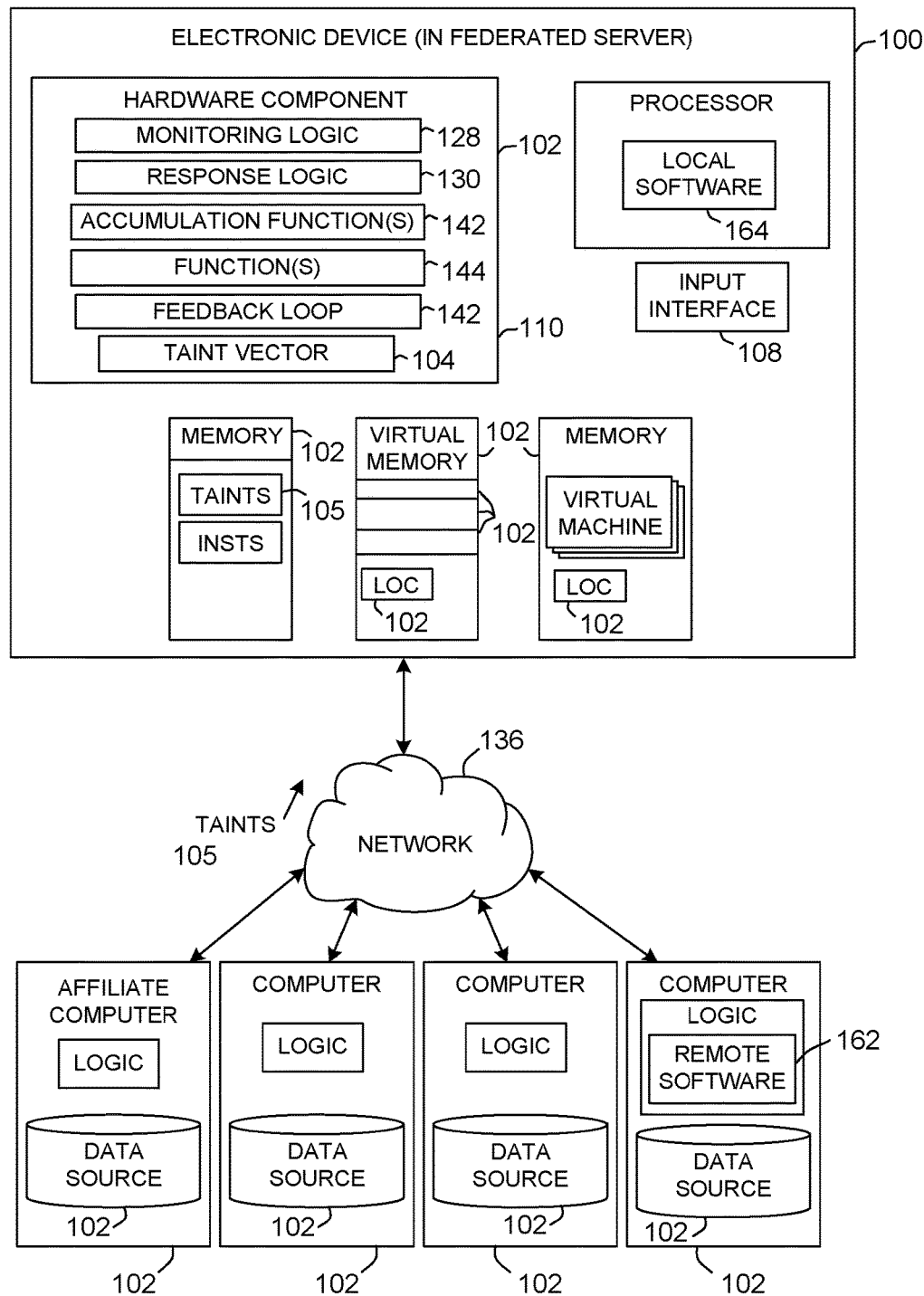
Figure 1F:
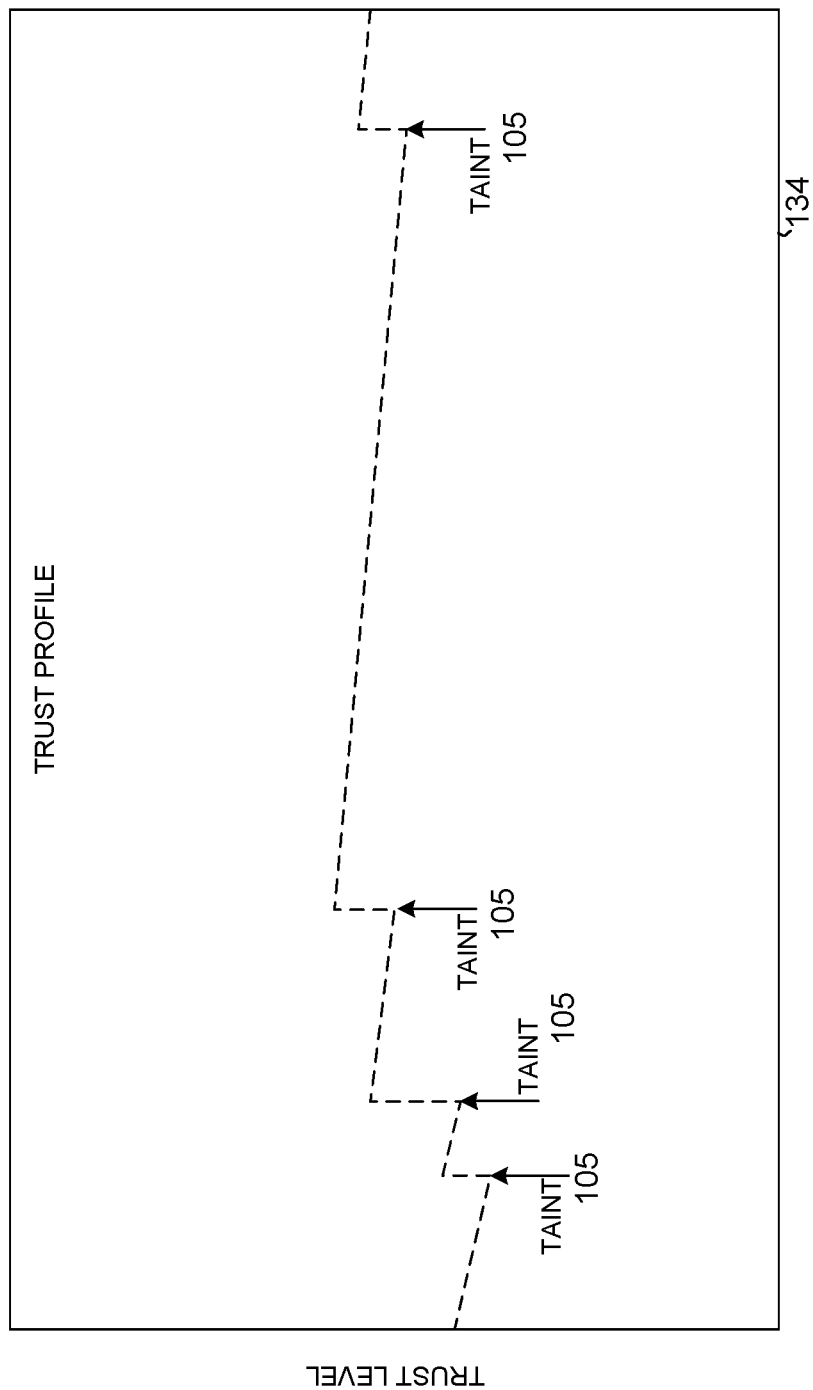
FIG. 1F is a graphical data description showing an aspect of operation of the electronic device.
Figure 1G:
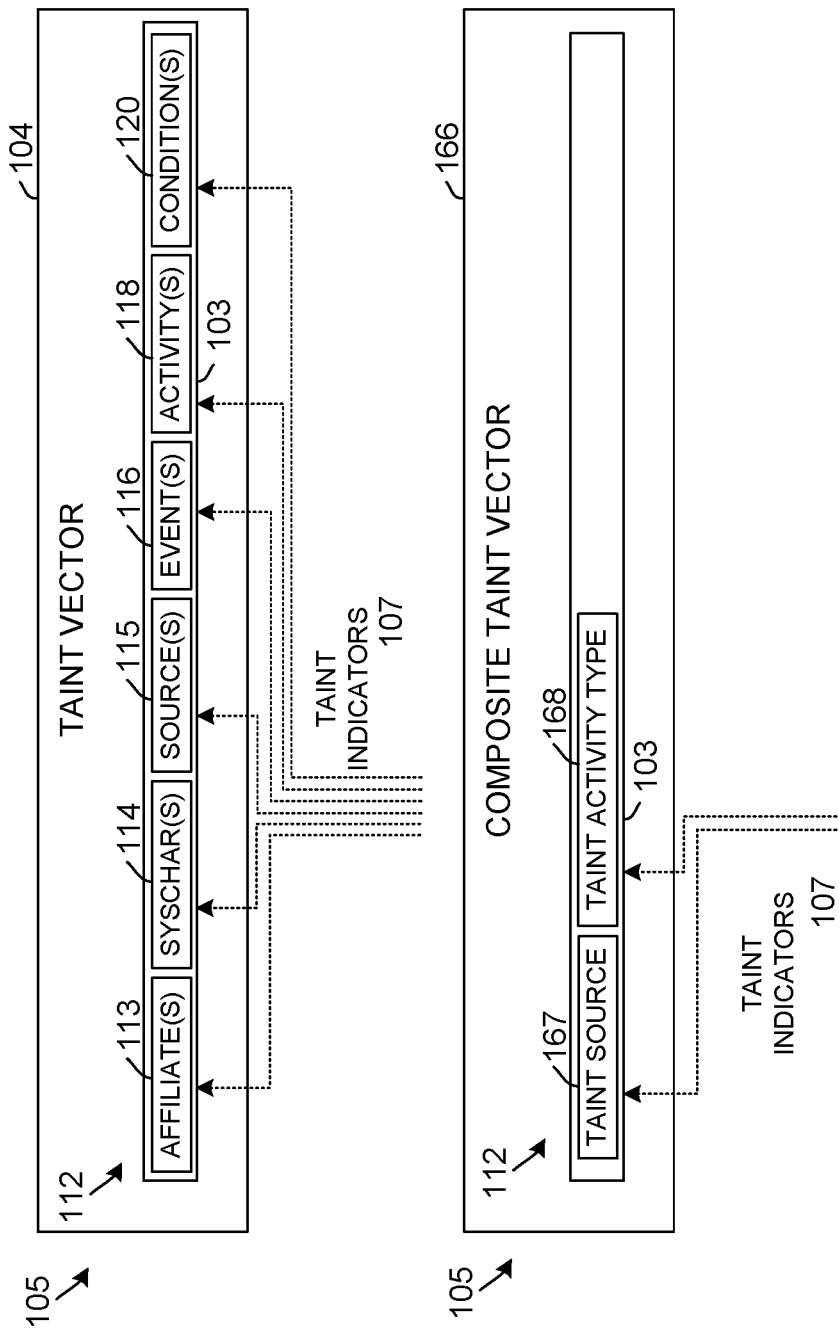
FIGS. 1G and 1H are data structure diagrams illustrating example embodiments of taint vector.
Figure 1H:
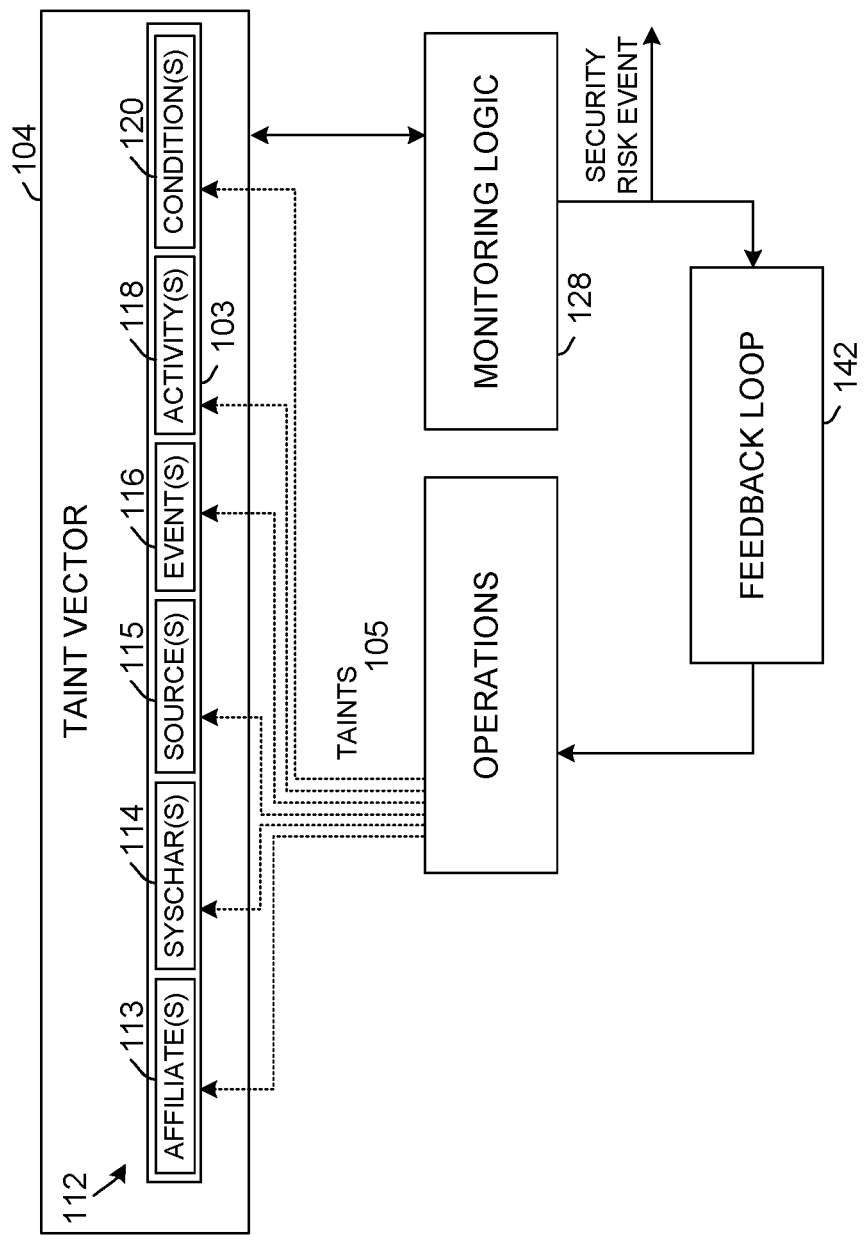

Referring to FIG. 1E, taint information can be received from a source that is remote from a targeted system, such as from an interface, a network, a gateway, remote computer, a cloud, and others. Thus, the electronic device 100 can be configured wherein ones of the plurality of taints 105 are injected by a resource 102 of the plurality of resources 102 that is remote from the electronic device 100. The at least one taint indicator 107 corresponding to the injected ones of the plurality of taints 105 can be communicated to the electronic device 100.

In a more specific embodiment, the electronic device 100 can be configured such that one or more of the plurality of taints 105 are injected by remote software 162 that is remote from the electronic device 100. The at least one taint indicator 107 corresponding to the injected ones of the plurality of taints 105 is communicated to the electronic device 100.

In some embodiments and/or in particular conditions, taints from local resources can be tracked and handled. For example, the electronic device 100 can be configured wherein ones of the plurality of taints 105 are injected by a resource 102 of the plurality of resources 102 that is locally coupled to the electronic device 100. At least one taint indicator 107 corresponding to the injected ones of the plurality of taints 105 can be directly accessed by the electronic device 100.

In more specific embodiments and/or conditions, the electronic device 100 can be configured such that one or more of the plurality of taints 105 are injected by local software 164 that is local to the electronic device 100. At least one taint indicator 107 corresponding to the injected ones of the plurality of taints 105 can be directly accessed by the electronic device 100.

Referring again to FIG. 1E, a electronic device 100 can be operable as at least part of a federated system which can be implemented in an infrastructure such as an architecture including servers and clients. For example, gaming code servers and gaming console clients can interact by running program code that executes in part on machines controlled by the server and in part on machines controlled by the client. Intrusion detection via accumulation of taints can enable the interaction to be mutually trusted by both sides. In an illustrative embodiment, the electronic device 100 can be operable as at least part of a federated system comprising a least a first source 115(1) and a second source 115(2). Accordingly, the electronic device 100 can be configured wherein ones of the at least one taint vector 104 comprise an entry 103 that is allocated to selected ones of the plurality of resources 102. The taints 105 of the selected ones of the plurality of resources 102 can be federated to the entry 103.

Referring to FIG. 1F in combination with FIGS. 1B and 1C, a graphical data description shows an example operation that can be executed by the electronic device 100 to facilitate intrusion detection using taint accumulation. In an illustrative embodiment, the monitoring logic 128 can be operable to monitor taints 105 and create a trust profile 134 based on the monitoring; and response logic 130 operable to trap to a software process 132 based at least partly on determination of a suspicious condition. For example, the monitoring logic 128 can form the trust profile 134 using accumulated taint indicators, dynamically raise and lower trust level of the trust profile 134 based on the accumulated taint indicators, and respond to security risk in response to the trust level.

As shown in FIG. 1G, various aspects of taint vector 104 locations and/or granularity can facilitate intrusion detection using a taint mechanism. In various embodiments, the electronic device 100 can be configured such that the plurality of taints 105 comprise one or more of a plurality of distinct classes 112 comprising a plurality of distinct affiliates 113, system characteristics 114, sources 115, events 116, activities 118, and/or conditions 120.

In some embodiments, the electronic device 100 can be configured wherein ones of the at least one taint vector 104 comprise a composite taint vector 166 that correlates a taint source 167 and a taint activity type 168.

A taint indicator can be generated in association with operation of a translation lookaside buffer (TLB) in a processor. A translation lookaside buffer (TLB) is a processor cache which can be used by memory management hardware to improve virtual address translation speed. Processors use a TLB to map virtual and physical address spaces. TLB are used widely in hardware which uses virtual memory.

The TLB can be implemented as content-addressable memory (CAM), using a CAM search key which is the virtual address to produce a search result which is a physical address. If the TLB holds the requested address—called a TLB hit, the CAM search quickly yields a match and the retrieved physical address can be used to access memory. If the TLB does not hold the requested address—a TLB miss, the translation proceeds by looking up the page table in a process called a page walk. The page walk is computationally expensive process, involving reading contents of multiple memory locations and using the contents to compute the physical address. After the page walk determines the physical address, the virtual address to physical address mapping is entered into the TLB.

A stream monitoring instruction can be implemented to improve efficiency and performance of the TLB by supporting a software predictor. The instruction can be used to monitor misaligned or split access. A memory access is aligned when the data item accessed is n-bytes long and the data item address is n-byte aligned. Otherwise, the memory access is misaligned. Monitoring for misaligned access can be performed by hardware, resulting in a trap, or somewhat less efficiently by software. In practice, monitoring for misaligned access has a high false positive rate, for example approaching 90%. A predictor can be configured, for example by microarchitecture adjustment or taint accumulation, to indicate whether the misaligned access hits are accurate.

The processor can be configured to change voltage, frequency, and/or power based on the number of cache misses. For example, logic can accumulate taint indicators to detect an abundance of cache misses or other performance problems, the voltage can be varied such as increased to cure the problem. The logic can dynamically adjust operating parameters according to the amount of traffic. Frequency and voltage can be adjusted, for example whenever a change in frequency occurs, the voltage can be modified accordingly.

Logic in a memory interface can detect when memory is full to some threshold level, for example 70%, for example by accumulating taint indicators. If memory is full to the threshold level, a predetermined taint indicator condition is found, and a high level of access is occurring, memory speed can decrease. In response, the frequency and voltage of operation can be dynamically increased to maintain a desired memory speed.

In various embodiments, logic for performing dynamic adjustment can be positioned in memory, in a logic interface, in a processor. A hardware configuration can optimize by active adjustment, redirection, or possibly a combination of adjustment and redirection. For example, a computation-intensive process with many instructions to be executed rapidly can be addressed by running the processor at a higher rate by increasing operating frequency and voltage, and/or some of the burden can be shifted to components other than the processor to maintain processor execution at a lower frequency.

Taint accumulation can also be used to allocate system resources. Various aspects of resource allocation include hardware threading, computational limits, pooled resources, entitlements, and others. Resource allocation can be handled via various architectural aspects of a system including microarchitecture, instruction set architecture (ISA), operating system, library calls, and taint accumulation. Software can associate capabilities with particular library functions or software objects. This software can be in the form of compiler, operating system, or others. The operating system can, for example, create a profile for any process running floating point operations and give that entitlement. Resources allocated include processors, central processing units (CPUs), graphics hardware, network controllers, memory, memory management, other hardware, and the like. Resources further include power, cycles, and the like.

Hardware Threading.

Several aspects of hardware threading are currently implemented in processors such as CPUs. Simultaneous threading (SMT), hyperthreading, or simultaneous hyperthreading relate to hardware execution of two or four threads selected for running at any time, managed according to many fine-grained scheduling decisions. In a cycle, two threads are selected at instruction fetch, typically at the front of the pipeline and hardware determines which of the two thread's instructions to fetch. An instruction for each of the threads pass to an out-of-order machine within which the instructions are running concurrently. For example, an arithmetic logic unit (ALU) instruction from thread 1 and a memory instruction from thread 2 can run simultaneously.

Another type of hardware threading is interleaved multithreading (IMT) which removes all data dependency stalls from the execution pipeline. One thread is relatively independent from other threads so the probability of one instruction in one pipeline stage needing an output from an older instruction in the pipeline is low. IMT is conceptually similar to pre-emptive multi-tasking used in operating systems.

In contrast to CPU multithreading which handle relatively few threads (typically two or four threads), graphics processing units (GPUs) are stream processors for computer graphics hardware and manage hundreds or thousands of threads, thus using much more sophisticated scheduling. When blocking occurs, for example on a cache miss such as from a memory reference, a very large number of threads are blocked. Threads are chosen for execution on massively parallel thread arrays. In a typical arrangement, a processor has approximately 64,000 threads of which only about a thousand execute at one time. Underlying operations during execution include scheduling, addressing cache misses, and the like. Rather than scheduling from a memory pool, GPUs schedule instructions for execution from a very large pool of threads, waiting for memory to become available to run the next thread.

A CPU can be configured for a CPU thread hierarchy which includes a currently running list and a pool of non-running threads enabled to receive information pertinent to computational limits from devices or components such as special-purpose hardware. In an illustrative embodiment, the information pertinent to computational limits can be monitored via taint indication and taint accumulation, and resources allocated accordingly.

Computational limits can be imposed via generation of taint indicators and taint accumulation. A limit on computation can be imposed according to setting of priority level which is, in turn, based on available resources. One example resource that can be monitored to set limits on computation is the battery. Limits on computation can be imposed based on battery consumption, battery life remaining. Computational limits can be addressed via a framework of setting capabilities, for example specifying a capability to execute on selected processing resources. In an example implementation, the capability can be set up in metadata.

Taint accumulation is suitable for managing computational limits since addressing computational limits can be fairly complex, involving not only information from monitored resources but also user input. For example, a determination by hardware of low battery level and associated limited battery life can be overridden by a user who may request a software application to run in anticipation of being able to soon recharge the battery at a line power source.

Performance capabilities can be used in combination with taint accumulation to manage resources. A performance capabilities framework can be defined to address handling of a pool of available resources. A thread pool pattern can be configured wherein a number of threads are created to perform a number of tasks which are typically organized in a queue. Usually, the number of tasks is greater than the number of threads. A thread upon completing an associated task will request the next task from the queue until all tasks have completed. The thread can then terminate or become inactive until new tasks are available. The number of threads can be tuned to improve performance, and can be dynamically updated based on the number of waiting tasks. Increasing the size of the thread pool can result in higher resource usage.

A hardware scheduler can respond to any countable or measurable operating condition or parameter, for example electrons, constraints, frequency, cycles, power, voltage, and the like, to control the thread pool and pool of resources. The countable or measurable operating conditions and/or parameters can be monitored over time using taint accumulation. Two highly useful conditions or parameters for monitoring are power and cycles, which are the basis for other measurable phenomena. Monitoring of operating conditions can be performed in hardware or via software call.

Furthermore, software can associate capabilities with particular objects such as libraries.

Taints for main memory may be located in different places, organized differently among different memory locations or types, and/or associated with different amounts of memory. In an example configuration, a single taint vector can be allocated for all main memory, which can have multiple entries that are associated with different memory ranges. Taints can be organized by or applied to memory pages. Level of taint may be indicated per memory block. A separate taint table can be used if a general page table is read-only, and a size of a separate taint table may be reduced via hashing. Taints can be applied on a per-byte basis, but then likely only 1-2 bits and significant overhead. Accordingly, as shown in FIG. 1D, taints can be associated with main memory to facilitate intrusion detection in a taint mechanism. Thus, various aspects of taint vector location and/or granularity can be formed in memory.

In an example software embodiment, software can monitor the system over history, or can be preprogrammed, and fills in some sets in entitlement vector fields. Software can determine values for the fields and fill in the bits of data, possibly associated as a lookup table, an associated hash table, an extra field to call for a library, and the like. For a library call, an entitlement vector EV is returned. The entitlement vector can be received from various sources, for example from external to calling software. For example, the entitlement vector EV may be installed into hardware as a side effect of the library call.

A factor in determining whether the entitlement vector is handled in software or hardware is the size of the vector.

In an example hardware implementation, a suitable entitlement vector size is 256 bits, although any suitable size is possible. For example, a vector of 64K bits is generally considered too large for hardware implementation.

In some embodiments, an entitlement vector can be associated with each library. The entitlement vector can be used, for example, to eliminate floating point if desired, reduce the number of floating point operations if such operations are rarely used, reduce the scale as appropriate when full accumulator width is unnecessary, increase support for the ALU.

The entitlement vector can be implemented as a call with a memory address made in association with a call to a library which, for example, can return a pointer or address location to the entitlement vector.

Another field of the entitlement vector can be a chooser/thread selector. The entitlement vector can be used by the chooser/scheduler, which includes logic that performs operations based on a single entitlement vector or possibly relative entitlement vectors. Each Instruction Pointer (IP) or thread can have an associated entitlement vector. For example instruction pointers, for IP1, IP2, IP3, IP4, then four entitlement vectors can be allocated. Chooser/scheduler logic considers the entitlement vector when scheduling the next thread for computation. The logic informs the chooser/scheduler about how to make the selection. The logic can perform selected functions to make the choice and for scheduling, for example by elevating or decreasing priority of a thread.

An example function using an entitlement vector (EV) can compute the sum of weighti times EVi compared to the usage vector of Threadi, a simple target function for evaluating when to schedule threads from the highest priority to the lowest priority. Thus, for a thread with high priority and large requirement for resources, the thread can be elevated in the scheduling list and resources are likely to be allocated. In contrast, a thread that is a glutton for resources and has low priority is likely to be deferred by the scheduler, moving back or to the end of the list of scheduled threads. A high priority thread that consumes only limited resources is likely to be moved up in the schedule list, possibly to the front of the list.

In some embodiments, the entitlement vector supplied by a HINT instruction can be modified by a capability process. Illustratively, the entitlement vector can set entitlement to use X resources which can be limited by the operating system for example by reduced weighting or setting of maximum allowed resources. The entitlement vector can also be limited according to usage, wherein a thread using an inordinately large amount of resources can be limited when the high usage is detected or predicted.

The entitlement vector function Fi (wi, EVi, vi) of weight (wi), entitlement vector (EVi), and resource volume (vi) can be either linear or non-linear.

The entitlement vector enables association of scheduling with functions. The entitlement vector further enables association of priority with functions.

One of the challenges in allocating resources is the potential for highly unpredictable changes in resource demand. For example, minor changes in workload can result in substantial variation in performance. Another challenge is unpredictable behavior in response to context switches from one process to another. One technique for dealing with these challenges is making a library call as a technique for determining whether a context switch occurred or, if not expecting to make a library call, perform an action that randomizes priority. If degradation results from making the library call, then performance can be monitored to determine whether performance is reduced. If so, priority of the threads can be randomized. Example techniques for randomization can include a Boltzmann search, simulated annealing, hop-around, other lateral computing techniques, and the like. A Boltzmann search can be performed by a Boltzmann machine, a stochastic recurrent neural network that is capable of learning internal representations and solving combinatoric problems. Simulated annealing is a computer technique used for answering difficult and complex problems based on simulation of how pure crystals form from a heated gaseous state. Instead of minimizing the energy of a block of metal or maximizing strength, the program can minimize or maximize an objective relevant to the problem at hand, specifically randomization to attain stable performance. In a hop-around technique, priority or other parameters can be bounced around to determine a local maximum but not global optimum. Search optimizations can be used to determine whether truly at a maximum value. The new results can be compared with an old optimum.

In some embodiments, a supervisor circuit, for example for thermal and/or overvoltage protection, can modify the entitlement vector.

The entitlement vector, for example in combination with a usage vector and/or taint accumulation monitoring, can be used for monitoring power control. In various embodiments, power control monitoring can be performed remotely or locally, possibly by the operating system.

In an example embodiment, a user can supply an entitlement vector using instructions, for example by specification of the beginning and end of a function. The entitlement vector can be used in association with a performance monitoring unit which monitors and determines other entitlement vectors. In various embodiments, the entitlement vectors can be maintained separately or combined into a single effective entitlement vector.

Context switches can be specified as taint indications for usage in taint accumulation. Context switches can be defined as switches from one process to another. In contrast, a thread can typically be considered limited to a single context. Standard threads and mock threads share resources including context and can have multiple processes, multiple threads within the same privilege level technically. However, a threading library and threading operating system can be created wherein threads are not limited to the same context. Threads can comprise simply a stack and an instruction pointer, and can run in the same address space, for example threads can run as different users in the same address space. In a case of multiple users accessing the same database, if the database is a shared-memory database, software or an interpreter can be responsible for ensuring that unauthorized user(s) cannot access certain data. In the case of users assigned different privilege levels or different threads in the same virtual memory address space assigned different privilege levels, different registers are assigned to particular users and/or threads, and thus switches between users and/or threads are context switches.

Privileges can be associated with a page, a page table, an actual physical memory address, a virtual memory address, and the like.

Capabilities and entitlement can be used in combination with taint accumulation for managing resources. In some embodiments, the capabilities vector and the entitlement vector can be merged. In some aspects of operation, entitlement can be considered to be a capability. With entitlements specified, the associated performance capabilities and management of associated capabilities prevents unauthorized access to data and/or resources, and prevents system takeover, unless specifically allowed or enabled by a system call, improving security and enabling denial of service to attacks.

Merged capabilities and entitlement can be used to prevent microarchitectural denial of service. Denial of service is typically considered to arise from a hacker on a network blocking access by using up all or a substantial part of network bandwidth. For example, when operating on a virtual machine in a cloud computing platform (such as Amazon Elastic Compute Cloud (EC2)) a job can be run that thrashes the cache, resulting in an architectural denial of service in response. Preventative remedies can include checking for performance counters and preventing such unauthorized accesses. Microarchitectural remedies can also be used such as implementing microarchitectural covert channels in which, for various types of code, secret keys running on the same virtual machine can be detected. Similarly, microarchitectural covert channels can be used to monitor timing of code to detect intrusion and to detect whether a bit is set in a particular bit position which may indicate intrusion. Microarchitectural techniques can thus include timing channels and covert channels for use whenever a shared resource is to be modulated. Covert channels can be applied, for example, in modulating a disk arm, detecting seeks on a file system.

In various embodiments, operations implementing and using the entitlement vector can be executed by software in a processor, by microcode, in logic, in hardware, or the like.

An infrastructure configured to support multiple processors in a system can have a shared memory and message passing between threads, processes, processors, and the like. Operating systems (OS) can include various mechanisms to enable message passing, for example pipelines, daemons that use sockets, loopback, and the like. Any suitable number of processors can be supported in the system, from relatively small systems with few processors to large scale systems with hundreds of thousands or millions of processors. In a typical large scale system, the multitudes of processors communicate via fat trees which support the large amount of bandwidth demanded by the large scale system. The amount of bandwidth in different positions in the tree is variable, depending on traffic. In various other configurations, the many processors can communicate via meshes or buses, via Gigabit Ethernet, via CDMA-CE (Code Division Multiple Access—series CE), and the like. In large interconnects, the number of processors determines what functionality is attainable. For example, for more than about 1000 processors, memory can no longer be shared. At around 100 processors, memory space can be shared but cache-coherence is typically not possible and memory is thus non-cache-coherent shared memory. Cache-coherence is generally considered to cause problems for more than about sixteen processors so that fewer processors at a first level can have cache-coherent shared memory.

For a supercomputer or other system with the large number of processors, for example more than about 1000, for which memory is non-shared, Message Passing Interface (MPI) can be used for communication. MPI uses multiple threads but does not use shared memory. The MPI multiple threads are all part of local shared memory, but no global shared memory exists. The amount of local shared memory is limited, resulting in a communications bottleneck. Supercomputer memories use Message Passing Interface (MPI) which, to a first order, includes a limited number of instructions such as send some location, buffer, end buffer, and receive some entity, buffer, end buffer, and the like. MPI is an application programming interface (API) and is thus a library call. The received entity can be, for example, a channel connecting the sender and the receiver, although channels are rarely used in MPI since channels do not scale beyond about a thousand processors. Accordingly, MPI can use commands with masks which identify which processors are to receive a message. A difficulty with MPI is that different code must be written, and a different core engine and interface, for small-scale and large-scale parallelism. Thus, send-and-receive communication such as is used by MPI is suitable if memory is shared.

What is desired is a technique for expanding send-and-receive communication more broadly. In accordance with system and method embodiments, a communications application programming interface (API) can be created that enables communication between different types of threads and hides that the threads are sharing memory. The communications API can enhance functionality of a Transmission Control Protocol (TCP) socket. The TCP socket, also termed an Internet socket for network socket, is an endpoint of a bidirectional inter-process communication flow across and Internet Protocol (IP)-based computer network such as the Internet. In some embodiments, the communications API can also incorporate functionality of MPI into that of a TCP socket. In a distributed system, a processor can communicate with a Network Interface Controller (NIC) and a send instruction puts data on a queue to send to the NIC and pass through the routing network to a specified destination. The communications API can perform communications via TCP-IP, in some configurations optimizing aspects of TCP-IP such as by ordering packets, and also via other protocols. The communications API can include send-and-receive functionality, and include one or more channels, which is operable with TCP-IP. Some of the channels can be shared memory in the form of a buffer with a counter. Some channels can connect to the NIC, some channels to TCP-IP, and some channels can have other functionality. In some embodiments, the communications API can support different types of channels. One example of a channel type is simply registers. Another type of channel can run two hardware threads with a pipeline coupled between the two threads.

The communications API can be adapted to handle the possibility of overflow. For example, for a channel implemented as shared registers, filling the registers to capacity can cause overflow to memory, which can call a trap or exception. In some embodiments, an overflow condition can be specified as a taint indication and accumulated for resource management.

Another technique for expanding send-and-receive communication more broadly can comprise creating a message passing infrastructure in hardware. Speed is one advantage of forming the message passing infrastructure in hardware. For example in the case of a system call, conventionally a slow operation, hardware can be configured to support a send instruction operable to check a bit in a channel selected for the send operation to determine whether the channel is available and, if not, performing a system call by faulting to the system call. Thus, the hardware can be configured to pass execution through the operating system in response to desired conditions.

In an example embodiment, the message passing infrastructure hardware can be configured to avoid passing execution through the operating system, for example to avoid the context switch inherent with going to the operating system. In another example embodiment, the hardware can be configured to include a message passing paradigm and one core can be run in ring 0 to enable access to operating system calls. The operating system is not a separate process but rather a library call in a library. Another option is to allocate a hardware thread to the operating system.

The operating system performs a ring 0 call via a system call which, in terms of hardware implementation, can be a function call to change a bit, granting permission to change the bit, and identification of the stack from which the OS is operating. In one example implementation, the user can explicitly control the stack, for example by placing the operating system stack in a different register. In another implementation, a system call can change the instruction pointer and the stack.

The message passing infrastructure hardware implementation can, for example, include support for send and receive calls. The hardware implementation can enable faster operating speed. For particular special cases, hardware send and receive calls can be faster than a shared library call. Send and receive are global messages, supporting point-to-point communication in two-party messaging. In some embodiments, the hardware implementation can support put and get APIs to enable sending a message to a designated address asynchronously or synchronously, as selected. The designated address is in a global address space partition, not local load-store. The put and get APIs can handle access to shared physical memory by sending a request to the master or server for the designated memory location. The memory is hashed across all the global memory space. In the illustrative implementation, get and put can be system calls rather than instructions, thus facilitating global access. Because the get and put system calls are relatively resource-expensive, efficiency can be attained by communicating blocks of data, for example 64K, at one time rather than for individual bytes.

For a cache-coherent shared memory that is accessed using the put and get system calls, different schemes can be used depending on what entities are communicating. For entities which share memory, the get and put calls simply access the shared memory. For entities separated by substantial physical or network distances, the get and put calls, if unable to fulfill the call by shared memory access, by running through the same router or similar local actions can send the calls to the network interface to relay remotely, for example across the world. For shared memory, whether cache-coherent or cache-noncoherent, the put and get, and send and receive operations are relatively simple since all entities can access the same memory. More complexity arises when memory is not shared. In various embodiments, when memory is not shared different schemes can be used such as copy-on-write (copying the shared memory), creating in remote memory the shared memory that shares the same capability, an implicit in the put and get, or other options.

The message passing infrastructure thus can include hardware support for the various put and get, send and receive, or the like system calls or instructions. The message passing infrastructure can be configured to enable two threads to be forked and used with the put and get calls to enable optimum speed performance. The send and receive, and put and get instructions, as described, consume two hardware threads or might consume two passive threads.

In some embodiments, the put-get and send-receive can be combined with access bits which designate memory to which the sender is allowed access. Passing along the access bits can enable a reduction in overhead while enabling protection across processes. The overhead of switching or sending a message drops significantly because the receiver already knows the memory to which the sender has access.

In some embodiments and/or applications, taints 105 can be applied to memory 142 segregated by type to facilitate intrusion detection using the taint mechanism. Memory can thus be segregated into different types such as for code and data memory, or the like. Different types can have taint mechanisms applied differently to the different types. For example, different memory types can have different levels of granularities, for example larger or smaller blocks of memory per taint vector. Also, different memory types can have more or fewer bits per taint vector entry. Furthermore, different thresholds, decay rates, and the like can be applied to different entries corresponding to different memory types.

In an example embodiment, a software model can be configured to use and enforce performance capabilities. In a relatively simple operation, if power is too low, then the software can limit the maximum number of threads or other capabilities. For example, in a cell processor case the number of threads can be limited to less than 1000. Fundamentally, software can disable functionality if sufficient power is unavailable for scheduled operations.

In another example, a sensor or sensors can detect whether battery bias voltage level is recovering too slowly or, similarly, a thermistor can indicate a battery is too hot which may indicate operating at too aggressive a level. A bit or bits can be set indicating the recovery time is too long. The set bit(s) can be used to throttle the maximum thread hopping rate in the case of a CPU with two threads. The bits disallow a thread hop and set an allowable rate of thread hopping; or perhaps allow thread hopping which creates slowing but saves power.

An example of performance capability monitoring and management can be implemented in a CPU with four process threads each having instruction pointers. One of the four threads is selected to execute for next instruction cycle. Various types of information can be monitored to determine which thread to select including recent demand for power, memory, CPU cycles, and the like. For example, a process can be a resource glutton and allocated fewer resources to enable other processes priority. Information is available relating to recent performance, requested performance, and acceptable performance (niceness).

Another option is to use a "NICE" instruction which can be used to adjust the priority level of predetermined instructions, enabling the instructions to be run in the background at a convenient time. For example, if a processor or battery is running too hot, the NICE instruction can reduce the urgency of executing code. In a particular example implementation, the NICE instruction can change a multiplier and step of a decay algorithm.

High and low capabilities can be specified. For example, a particular software routine can sometimes, although rarely, use floating point operations so the capability for such routines can be set low. Operations performed by software can include monitoring, configuring parameters, and the like.

The electronic device 100 can be configured to manage or control various aspects of operation. For example, in some embodiments the electronic device 100 can be operable to configure bit fields of the taint vector 104 to include primary and secondary criteria corresponding to selected taint indicators 107 and to include information and/or identifiers relating to actions, consequences, and usage.

Similarly, in some embodiments the electronic device 100 can be operable to configure the bit fields of the taint vector 104 to set a hierarchy of suspicion based on source, type, and/or identity of an event.

In some embodiments, the electronic device 100 can be constructed to manage taints passed via network such as the Internet. For example, the electronic device 100 can be operable to receive taint indicators 107 from a tagged system call associated with accessing information from a web page wherein an operating system injects a label indicating origination from a browser at an identified site.

The electronic device 100 can be arranged in some embodiments and/or under specified conditions to monitor taints on the basis of source or event which originates data, rather than aspects of the data itself, such that the electronic device 100 is operable to configure bit fields of the taint vector 104 to include tolerances based on questionability of a source and/or event.

The electronic device 100 can be constituted to segregate memory in a variety of ways. For example, in some embodiments the electronic device 100 can be operable to configure a taint vector 104 to segregate memory by type.

In particular embodiments, as selected, the electronic device 100 can be operable to configure a taint vector 104 to segregate memory by type at a selected granularity.

Similarly, some embodiments of the electronic device 100 can be operable to configure a taint vector 104 to segregate memory between program code memory and data memory.

In various embodiments, taint indicators 107 and taint notifications can be generated from any suitable source including either software, hardware, or other components and devices of electronic device 100, or from any source remote from the electronic device 100 such as a network, other systems connected to the network, and the like. In a particular example, the electronic device 100 can be operable to track taints 105 using hardware devices and insert initial taint notifications using software components.

In some embodiments, the electronic device 100 can be operable to dynamically adjust rate and period of updating the taint vector 104 using a taint adjustment vector comprising at least one parameter.

Similarly, the electronic device 100 can be operable to automatically decrement a set of rates using at least one timer, and apply at least one parameter of a taint adjustment vector to the taint vector 104 upon expiration of the at least one timer.

In various embodiments and/or conditions, the electronic device 100 can be operated to ignore events that may or may not indicate potential intrusion wherein the electronic device 100 can be operable to determine whether to ignore one or more taint indicators 107, and to log occurrences of the ignored one or more taint indicators 107 in an ignore problems taint vector.

Capabilities can be used to implement security. Typically, a system has only a few predetermined capabilities. However, a system can be configured in which every memory addressing register is assigned a capability. If the register specifies a capability to access the associated memory location, the location can be accessed. Otherwise, access is prohibited, for example producing a fault or incrementing a counter or accumulator, such as a taint accumulator, which can be noted in an intrusion vector. For any aspect related to security, if a test is failed, the counter is incremented and placed in the intrusion vector.

An instruction can be specified in an instruction set which sets a capability. In various embodiments, the instruction can be implemented in software, hardware, the operating system, or the like. The instruction can operate in association with a capabilities vector. In some embodiments, the instruction can also or otherwise operate in association with a hint vector.

The capabilities vector can be associated with a pointer, an address, and an object. A highly basic capability is a lower bound and an upper bound. Other more complex capabilities can be implemented. In various implementations, the capabilities vector and the entitlement vector can be separate, or can be combined. Merging the capabilities vector and the entitlement vector enables software structuring.

The capabilities vector can be used to enable fine-grained permission. Fine-grained permission facilitates operations of multiple users or entities in a shared memory data base, enabling the multiple users to access storage such as disk and to perform system calls, but limit access to data only to the user who owns the data or is authorized to access the data. Another benefit of fine-grained permissions is an ability to facilitate and improve security while multiplexing software threads onto hardware threads. In an example configuration, 64000 software threads are multiplexed onto only four hardware threads. Only a small portion of the software threads are running at one time with the remaining software threads idle. The software threads alternately run on the hardware threads, then go back to idle to allow other software threads to run.

A classic security hole in a database management is the inability to limit access to data for the different software threads multiplexed onto the hardware threads. A database typically does not allocate a hardware thread to a user. In typical database operation, a request is received and placed on a software thread so that users are multiplexed onto the software threads, an action giving very little protection. Better protection is attained by allocating each user to a separate process, a technique that is prohibitively expensive because the threads are expensive. Multiplexing the users onto software threads leaves a security hole because access to a particular user's data allowed while running the user's software thread on a hardware thread is not removed when the user's software thread is swapped out from the hardware thread. The access permission remains so access remains enabled. The depicted system solves the security hole by using capabilities.

In a non-capabilities system, any of the software threads can access the entire database at any time, including any data that has been placed in shared memory (unless a call out is made through the operating system to enable any of the threads to create I/O, a prohibitively expensive operation).

Simple databases only have one peer thread so all threads can access any data. Many typical databases have 64 threads that can access any data in shared memory but only four threads that can access I/O. These systems sometimes have different privilege levels (for example, Intel's rings 0, 1, 2, 3) so specify compatibility. Most code runs in ring 3 and the kernel in ring 0. Rings 1 and 2 are generally not used although several databases have features that can run in ring 1 and ring 2 but are rare and used primarily for benchmarks (a benchmark hack).

In an example implementation that uses capabilities, generally a processor has 16 or 32 registers, some of which are addressing registers. A capability can be loaded to enable access to selected threads. A capability can be loaded to access a particular thread (owned by another user) into hardware thread 0, enabling running as that user. This is one type of context switch—to change the software thread that is executing on hardware thread 0. The capability registers can then be changed, a minor context switch and a change in privilege level. The action does not invalidate translation lookaside buffer (TLBs), but rather moves the permissions out of the TLB. The access control model is also changed. Capabilities can be used in this manner to change operations, guaranteeing only access to data and/or resources for which access is allowed by a permission-granting entity. Capabilities can guarantee a transitive exposure of only the data and/or resources of another user according to granted authorization. The technique is deterministic so that, by inspection, which accesses are possible is known.

Intrusion detection can use the concept of capabilities to implement fine-grained security.

Entitlements can be monitored using taint accumulation. Entitlements can be used to allocate resources. Entitlements can be defined as user-specified rights wherein a process is entitled to a predetermined percentage of power or of time. A scheduler or chooser can monitor entitlement values and schedule the next highest priority process. A particular scheme can allocate modulo by bit to avoid starving a process with lower entitlement. In some conditions, the level of entitlement can be overridden or adjusted. Entitlement can be set according to a predetermined algorithm which defines a "fair share" for the processes, for example round-robin, history-based, randomized, and the like, which are efficient since a large history need not be accumulated. Thus, an efficient and inexpensive hardware implementation is possible. In some embodiments, a request for resources can be treated as a taint indicator and accumulated using a taint accumulator or taint vector to determine how to allocate among processes.

A metric can be specified which enables modification of a goal. A selected level of entitlement to resource consumption can be assigned to each process. One example scheme can be a short, low complexity method which is implemented while storing a limited operation history. For example, when running low on battery charge, a sequence 1-2-3-4-4-3-2-1 can be used to determine whether any of the processes is a resource glutton and can rank the processes on order of gluttony. The most gluttonous can be assigned the lowest priority. Another option can rank processes according to gluttony in combination with another factor of goodness (niceness). Processes can be ranked for the next cycle with the most gluttonous given last priority or can be ranked according to gluttony and one other nice system criterion. Monitoring and/or control can be performed highly efficiently if hardware, although either monitoring can be performed either in hardware or software in various embodiments. Power management units in CPUs can be used for monitoring, for example to monitor for increases or decreases in voltage or frequency, and for thread execution selection.

Capabilities can be used to perform monitoring and allocation of resources. For example, granting the capability to run video processing software can be combined with simultaneous granting of power capability.

Power is typically global to a process or to an individual CPU. Use of capabilities enables more refined control of power, for example power can be made specific to an object or library routine. With power global to a process, the process will continue to run in absence of a fault, a page fault, a disk access, or the like, and will run until blocked by the operating system scheduler, allowing high power consumption. Use of capabilities enables power to be controlled on a per-hardware thread granularity. Use of capabilities further enables power to be controlled specific to a per-hardware thread granularity for throttling power.

Processors can use instruction prefetch to improve execution speed by reducing wait states. The processor prefetches an instruction by request from main memory before the instruction is needed and, when retrieved from memory, placing the prefetched instruction in a cache. When needed, the instruction is quickly accessed from the cache. Prefetch can be used in combination with a branch prediction algorithm which anticipates results of execution to fetch predicted instructions in advance. Prefetches conventionally operate independently. In some embodiments, a processor disclosed herein can prefetch according to holistic monitoring of operating conditions such as voltage, frequency, and the like to more accurately determine or predict which instructions to prefetch.

The cache can be reconfigured dynamically, for example beginning with a single large, slow cache which can be divided into a relatively small subcache and a larger subcache to enable faster operation. In embodiments disclosed herein, operating characteristics can be monitored to generate information for dynamic reconfiguring of the cache. In some embodiments, cache phenomena such as cache hits and misses can be handled as taint indicators for taint accumulation, for example using a taint vector, to facilitate handling of the cache. As a result of the monitored operating conditions, the cache can be selectively configured for slower or faster speed, larger and smaller cache subregions. In some conditions, part of the cache can be temporarily disabled, for example to save power. Monitoring of operating conditions can enable a suitable balance of considerations to determine whether part of the cache is to be disabled, for example determining whether the power saved in disabling part of the cache is appropriate in light of the power lost with a greater cache miss rate.

Disclosed system and method embodiments can use operating condition monitoring and holistic control at the level of calling an object. In an object-level paradigm, various objects or values (such as numbers, symbols, strings, and the like) can be combined to form other objects or values until the final result objects or values are obtained. New values can be formed from existing values by the application of various value-to-value functions, such as addition, concatenation, matrix inversion, and the like. Various objects have different impacts on system operations.

An example of an object which, when called, can have large consumption of power or other resources is video encoding which is a brute force, unintelligent algorithm which runs much more efficiently on dedicated hardware than a general CPU, and has real-time constraints. Video conferencing has similar real-time constraints.

Another object example is video games which perform many different tasks concurrently including processing geometry and processing video simultaneously, possibly processing speech for Skype communications, voice compression, input/output, and the like. Video games thus typically involve concurrent operation of multiple objects such as the game processing tasks and interface (Application Programming Interface, API) that perform different actions separately. The multiple objects are commonly run as separate threads, unless prohibitive due to the large amount of overhead in running threads that are not essential. Separate threads simplify programming.

In some configurations, applications, and conditions, multiple threads can be run wherein the threads need not be run in the same context.

Hyperthreading is a particular implementation of hardware threading. Software threading is a slightly different implementation of threading wherein the threads are often, but not always, related. In some implementations, a processor can include a GOAL register that can be used to set performance characteristics for particular threads. For example, if different routines (Skype, physics) are run in different threads, selected operating characteristics for the threads can be loaded into the GOAL register to give the threads separate issues. Allocating priority to the different threads can be difficult. In an illustrative system, priority to the threads can be allocated using a NICE utility which specifies acceptable performance for a particular operation and allows reduced priority in appropriate conditions for tasks that can be assigned lower priority with little or no consequence.

In an example implementation, priorities, particular types of priorities, and entitlements can be associated with particular library routines to facilitate management of relatively heuristic phenomena. A library can be constituted wherein entitlements are assigned to individual library routines. The library includes information for adjusting the priority of threads, for example by identifying a phenomenon as a taint indication and accumulating taint indications. In some configurations or applications, the library can support hint vectors, such as branch prediction hints to specify whether static prediction should be taken or not taken. In some embodiments, the library can be configured to support NICE-type handling of a hint vector.

A process scheduler can be constituted to support prioritized entitlements and resource allocations upon calling selected libraries. A typical embodiment includes such support in software, although hardware support can also be implemented. For example, a network library can include library routines adapted for heavy network usage so that resources giving access to the network are more important processes to schedule. More entitlements are allocated to network-related resources. Libraries can also be configured to handle secondary priorities that change dynamically. For example, a sound card can have a greater power priority and have a pattern of operation wherein a process uses a network card and possibly other subsystems in combination with the sound card. Thus, the network card and other subsystems can also be allocated a higher priority. Similarly, for a process which performs less modeling and number computation in lieu of higher input/output operations and sending of information, a higher level of priority can be allocated to input/output resources.

Entitlements can be used to specify operations of a library. For example, a library with entitlement to run a predetermined number of floating point operations per second can, in response to a condition of executing instructions with few or no floating point computations, use the condition as a hint to power down floating point hardware, thus saving power. Thus, if computations include fixed point operations but no floating point operations, an a priori indicator can be generated designating that the floating point hardware is not needed in the near future and can be powered down. A process can call a library and, if known that a resource is not needed, the resource can be temporarily halted, thereby changing the entitlement level of that process with respect to the resource (for example a floating point unit) to a very low point.

In the illustrative example, the entitlement level of the process with respect to the floating point unit can be changed to very low because the resource is not needed for a foreseeable duration. The process thus indicates to other processes a willingness to relinquish access to the source, for example a willingness to be "nice" about allowing others to use the resource, so that access is deferred in favor of any other process that uses the resource, or the resource is shut down if not currently needed by another process.

Rather than have hardware determine demand for a resource after instructions have been executed, the illustrative system and method can use a call to a library or the result of making a call to the library as an indicator of entitlement niceness. This entitlement can be enforced in the manner of capabilities, for example by requesting access to a memory region, a request which may be denied. The library can give information regarding entitlement, thus giving a priori knowledge.

Resource allocation can also be managed using hints. An illustrative instruction that uses a hint is a hint that not much floating point computation is to be performed, a hint indicative of power demand. For example, hints to maintain power at a low level or to maintain power at a high level. An exception can create problems when using hints, since a hint is not unwound in the event of an exception. For example, for a hint to maintain high power, an exception which changes the condition but does not reset the hint allows hardware to remain in a high power mode, potentially forever. Examples of problems with hint processing in conditions of context switching include problems with unlocking memory locations.

In contrast to entitlements, capabilities enable mechanisms to unwind.

Entitlement Vector can be used as part of or in affiliation with taint accumulation or a taint vector for managing resources. An entitlement vector can have multiple fields, for example including floating point, power, arithmetic logic unit (ALU), graphics triangle including any suitable entitlements, translation lookaside buffers TLBs, virtual memory usage, and the like. The entitlement vector can thus be used, for example, to power down the TLB as no longer relevant to operation, or to enable usage of a wide range of virtual memory.

Another field of the entitlement vector can specify scale. Examples of scale can be human scale, width of the accumulator, or any suitable scale. For example, for a finger print, a suitable scale can be no more than 2 MB.

A further field of the entitlement vector can be data path width, a similar concept to scale. A large instruction size, for example 1024 bits, wastes power, but typically only a portion of the bits are used at one time so that a desired subset of the bits can be activated, changing the data path width. The scale concept leads to the concept of a selected partial data path width. The data path width is part of the entitlement. For example, of 1024 bits logic can compute the number of bits actually needed and allocate that predetermined subset of bits, such as 128 bits. The data path field thus can be used to lower the data path width used of the available entitlement vector width, for example activating a super-accumulator data path width.

Figure 2O:
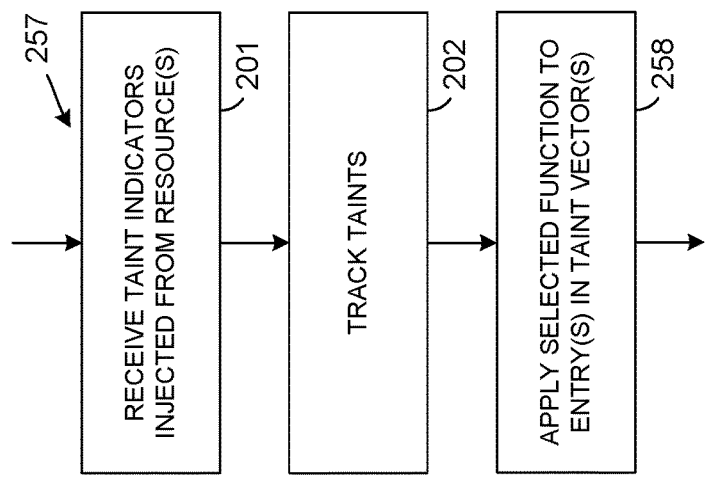
FIGS. 2A through 2U are schematic flow diagrams showing an embodiment or embodiments of a method operable in a computing device adapted to manage security risk by tracking taints and taint indications, and respond by trapping.
Figure 2N:
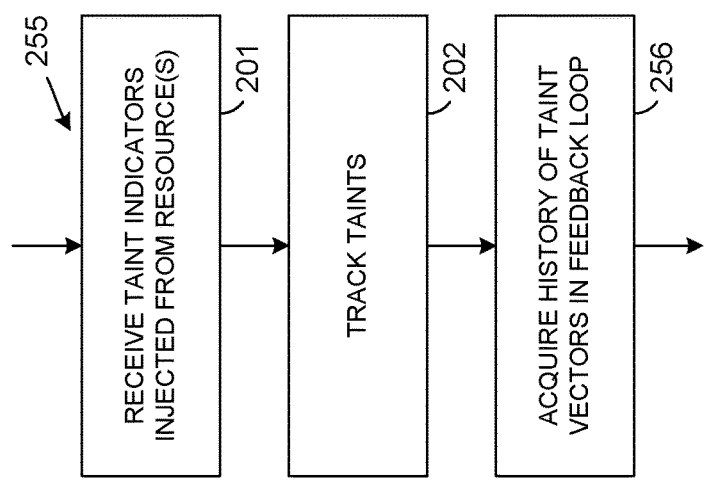
Figure 2M:
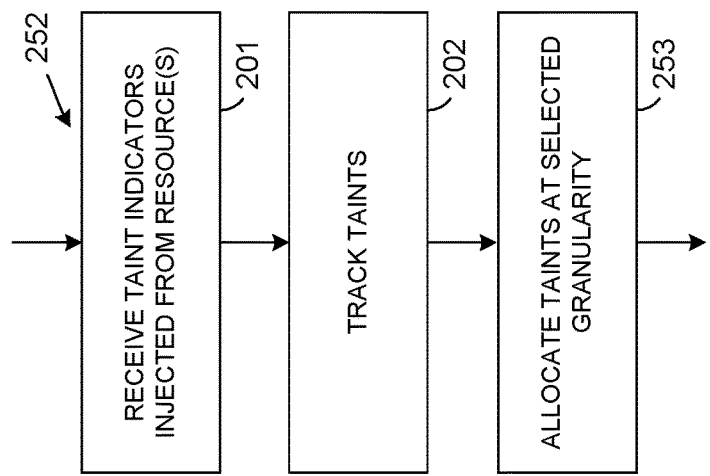
Figure 2R:
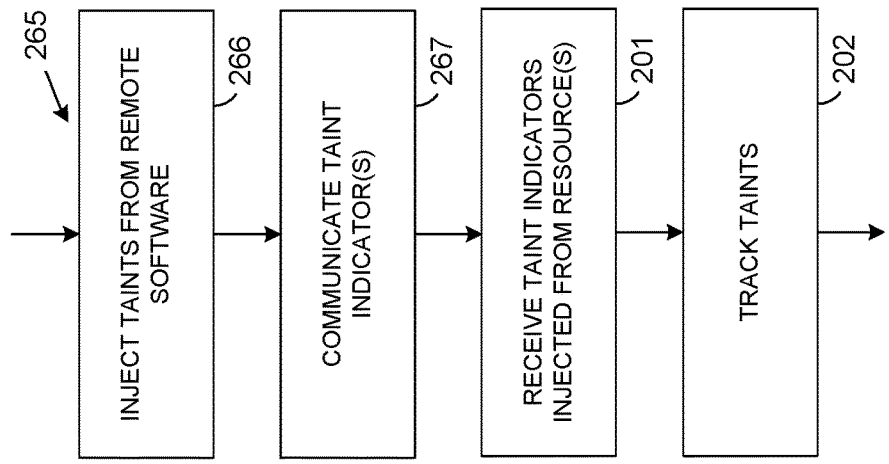
Figure 2Q:
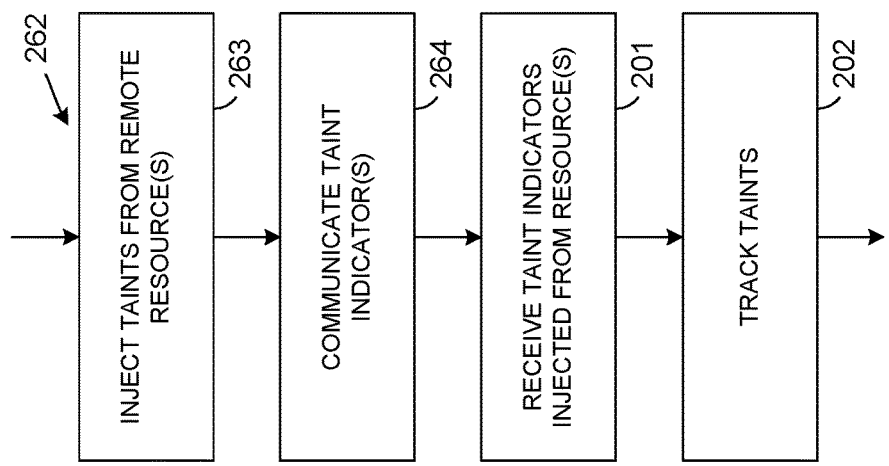
Figure 2P:
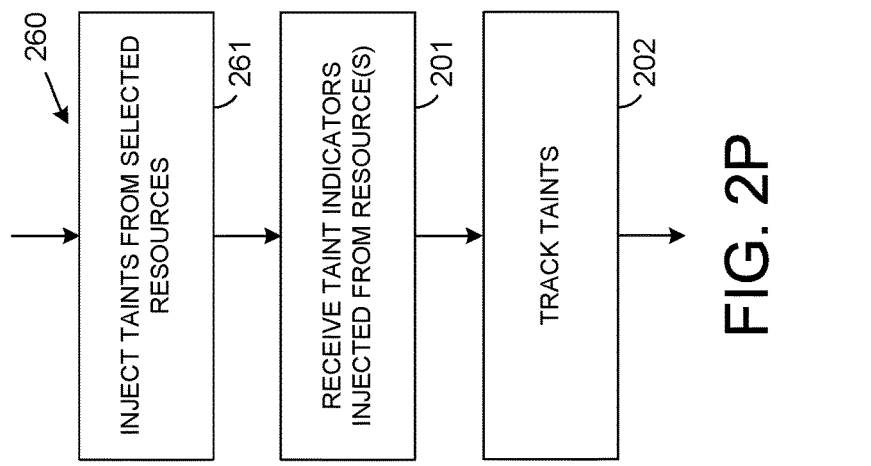
Figure 2U:
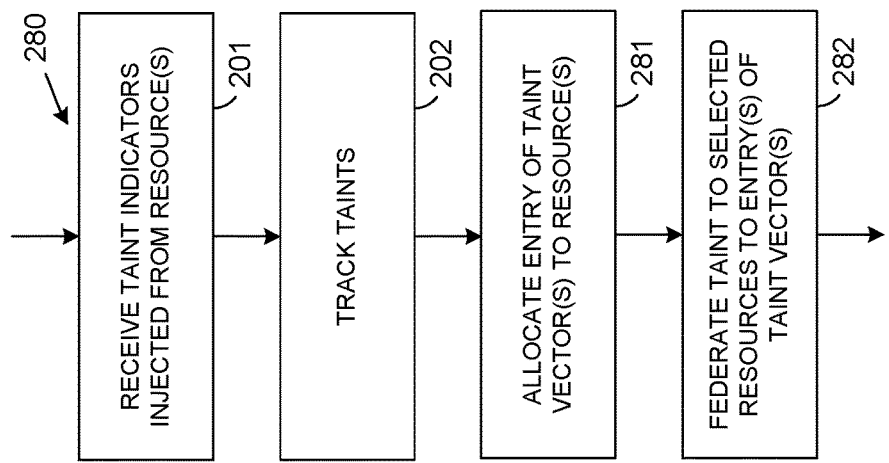

Referring to FIGS. 2A through 2U, schematic flow diagrams depict an embodiment or embodiments of a method operable in a computing device adapted to manage security risk by accumulating and monitoring taint indications, and responding to predetermined security risks by trapping. An embodiment of a method 200 operable in a computing device for handling security risk, shown in FIG. 2A, can comprise receiving 201 a plurality of taint indicators corresponding to at least one of a plurality of taints indicative of potential security risk and injected from at least one of a plurality of resources, and tracking 202 the plurality of taints.

Taints can be selected, for example, from one or more circumstances or phenomena including a null pointer reference, an attempt to access a secured part of a processor, an attempt to access a secured resource, a buffer overrun, and an event originating in a region that raises suspicion. Other example taints can include a fault, an integer overflow, a plurality of taint indicators that exceeds at least one predetermined threshold, a taint indicated by power law analysis, a taint indicated by a race function, and an attempt to access a key, and a variety of other circumstances or phenomena.

The plurality of taints comprise one or more of a plurality of distinct classes comprising a plurality of distinct affiliates, system characteristics, sources, events, activities, and/or conditions.

In some embodiments, as depicted in FIG. 2B, a method 205 can further comprise receiving 206 at least one taint indicator from a tagged system call associated with accessing information from a web page wherein an operating system injects a label originating from a browser at an identified site.

In some embodiments, as shown in FIG. 2C, a method 207 can be implemented which further comprises injecting 208 at a hardware component at least one taint of the plurality of taints when the at least one taint is known a priori to indicate an event and/or condition is suspicious.

Referring to FIG. 2D, embodiments of a method 210 for handling security risk can further comprise indicating 211 potential security risk originating from at least one of the plurality of resources by at least one taint of the plurality of taints, allocating 212 the at least one taint of the plurality of taints in at least one taint vector, and tracking 213 the at least one taint in at least one taint vector. The method 210 can further comprise monitoring 214 the at least one taint vector, and detecting 215 a predetermined taint condition wherein a predetermined condition of data is indicated.

In some embodiments, one or more of the at least one taint vector can comprise a composite taint vector that correlates a taint source and a taint activity type.

In various embodiments and/or conditions, illustrated in FIG. 2E, the method 220 can further comprise indicating 221 potential security risk originating from at least one of the plurality of resources by at least one taint of the plurality of taints, and allocating 222 the at least one taint of the plurality of taints in at least one taint vector. The method 220 can further comprise tracking 223 the at least one taint in at least one taint vector, and incrementing 224 the at least one taint vector upon detection of a predetermined taint condition wherein a predetermined condition of data is indicated.

In some embodiments, as depicted in FIG. 2F, a method 225 can further comprise indicating 226 potential security risk originating from at least one of the plurality of resources by at least one taint of the plurality of taints, listing 227 the at least one taint of the plurality of taints in at least one taint vector, and responding 228 to a predetermined taint condition.

In various embodiments and/or applications, shown in FIG. 2G, a method 230 can further comprise monitoring 231 the plurality of taints, creating 232 a trust profile based on the monitoring, and trapping 233 to a software process based at least partly on determination of a suspicious condition.

Various methods can involve monitoring of an aspect of tainting and responding to a monitored event. For example as illustrated in FIG. 2H, a method 235 can further comprise monitoring 236 the plurality of taints in network input/output operations, and trapping 237 to a software process based at least partly on determination of a network input/output condition of an attempt of malware to communicate to a malware operator.

In a further example embodiment of a method 240 for tracking taints and responding to a taint event, shown in FIG. 2I, a method 240 can further comprise monitoring 241 the plurality of taints using a hardware device, and inserting 242 initial taint notifications using a software process.

Referring to FIG. 2J, a method 245 can further comprise responding 246 to at least one security risk event with at least one response selected from a group of responses. A variety of responses can be performed, depending on criticality of a particular taint condition. Some responses are relatively minor for taint conditions that are assessed to be somewhat benign. Minor responses can include, among others, ignoring the at least one security risk event, logging the at least one security risk event, displaying a notification, displaying a warning message, and generating an alarm. Other response can affect operations and functionality while allowing actions to continue including, for example, preventing a memory and/or register write, modifying operating frequency, modifying operating voltage, modifying an operating parameter, and the like. More aggressive responses can be invoked for relatively critical taint conditions such as, among others, performing a system call, calling a trap and/or exception, terminating operation of selected resources, and activating a system shutdown.

As shown in FIG. 2K, in various embodiments and/or in various conditions, a method 247 can further comprise accumulating 248 a plurality of taint indicators indicative of potential security risk from a plurality of distinct sources at distinct times in ones of the at least one taint vector.

Similarly, as depicted in FIG. 2L, a method 250 can further comprise accumulating 251 the plurality of taint indicators independently using ones of the plurality of accumulation functions selected from several possible functions. The accumulation functions can include comparing ones of the accumulated plurality of taint indicators to at least one predetermined threshold, performing power law analysis, performing a race function, performing a counting function, and the like. Suitable counting functions can include counting the number of taints, counting the number of taints per memory unit, counting the number of instructions tainted, counting the number of tainted instructions, counting the number of instructions written as a result of a taint, counting the number of data loads and stores, counting the number of memory accesses, counting the number of calls, counting the number of returns, counting the number of branches, counting the number of integer overflows, counting the number of network input/output events, counting the number of null pointer references, counting the number of buffer overruns/overflows, counting the number of repeated attempts to access a key, and the like.

Similarly, referring to FIG. 2M, a method 252 can further comprise allocating 253 taints at a selected granularity. Examples of suitable levels of granularity can include allocating taints by memory page, allocating taints by byte, allocating taints by word, allocating taints by memory block, and allocating taints by hardware process identifier (PID). Other selected granularities can include allocating taints to enable a cross-thread taint, allocating taints among hardware devices, allocating taints by component, allocating taints by software component, and the like.

Referring to FIG. 2N, a method 255 of handling security can further comprise acquiring 256 a history of the ones of the at least one taint vector in a feedback loop that correlates taints with responses to the taints.

As shown in FIG. 2O, a method 257 can further comprise applying 258 at least one function to the at least one entry of the at least one taint vector. In various example embodiments and/or conditions, the at least one function can be selected from various functions such as weights, masks, sums, combinations, arithmetic functions, logical operations, transforms, and the like.

Taints for various resources can be located in different places, organized in various manners among different memory locations or types, and/or associated with different amounts of memory. Hence, referring to FIG. 2P, the method 260 can further comprise injecting 261 selected ones the plurality of taints by the plurality of resources of a group including physical and/or logical instances of processors, central processing units (CPUs), graphics hardware, network controllers, memory, memory management, hardware, microarchitecture, sound cards, video cards, network interfaces, instruction set architecture (ISA), library calls, library functions, software objects, compilers, operating systems, and the like.

Furthermore, as shown in FIG. 2Q, a method 262 can further comprise injecting 263 ones of the plurality of taints from a resource of the plurality of resources that is remote from an electronic device, and communicating 264 at least one taint indicator corresponding to the injected ones of the plurality of taints to the electronic device.

Likewise, as illustrated in FIG. 2R, a method 265 can further comprise injecting 266 ones of the plurality of taints from remote software that is remote from an electronic device, and communicating 267 at least one taint indicator corresponding to the injected ones of the plurality of taints to the electronic device.

Figure 2T:
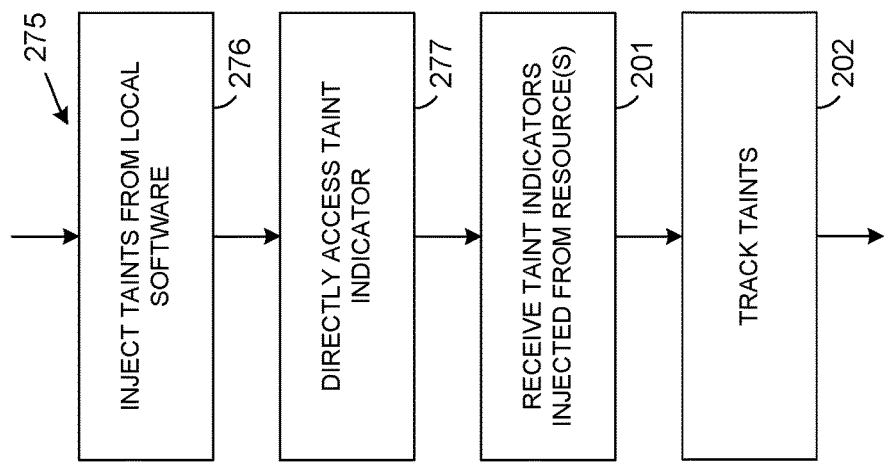
Figure 2S:
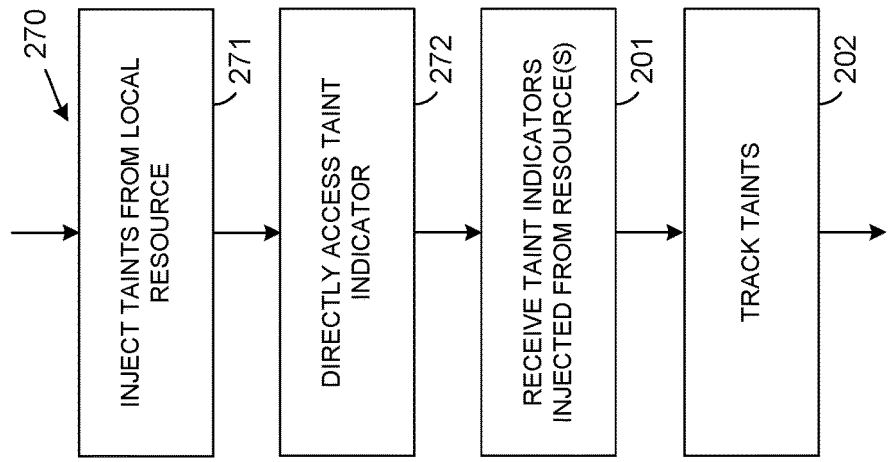

Referring to FIG. 2S, a method 270 of handling security risk can further comprise injecting 271 ones of the plurality of taints from a resource of the plurality of resources that is locally coupled to an electronic device, and directly accessing 272 at least one taint indicator corresponding to the injected ones of the plurality of taints by the electronic device.

Similarly, as shown in FIG. 2T, a method 275 of handling security risk can further comprise injecting 276 ones of the plurality of taints by local software that is local to an electronic device, and directly accessing 277 at least one taint indicator corresponding to the injected ones of the plurality of taints by the electronic device.

The method can be used as at least part of a federated system which can be implemented in an infrastructure such as an architecture including servers and clients. Accordingly, as depicted in FIG. 2U, a method 280 can further comprise allocating 281 an entry of one or more of the at least one taint vector to selected ones of the plurality of resources, and federating 282 taints of the selected ones of the plurality of resources to the entry.

Figure 3A:
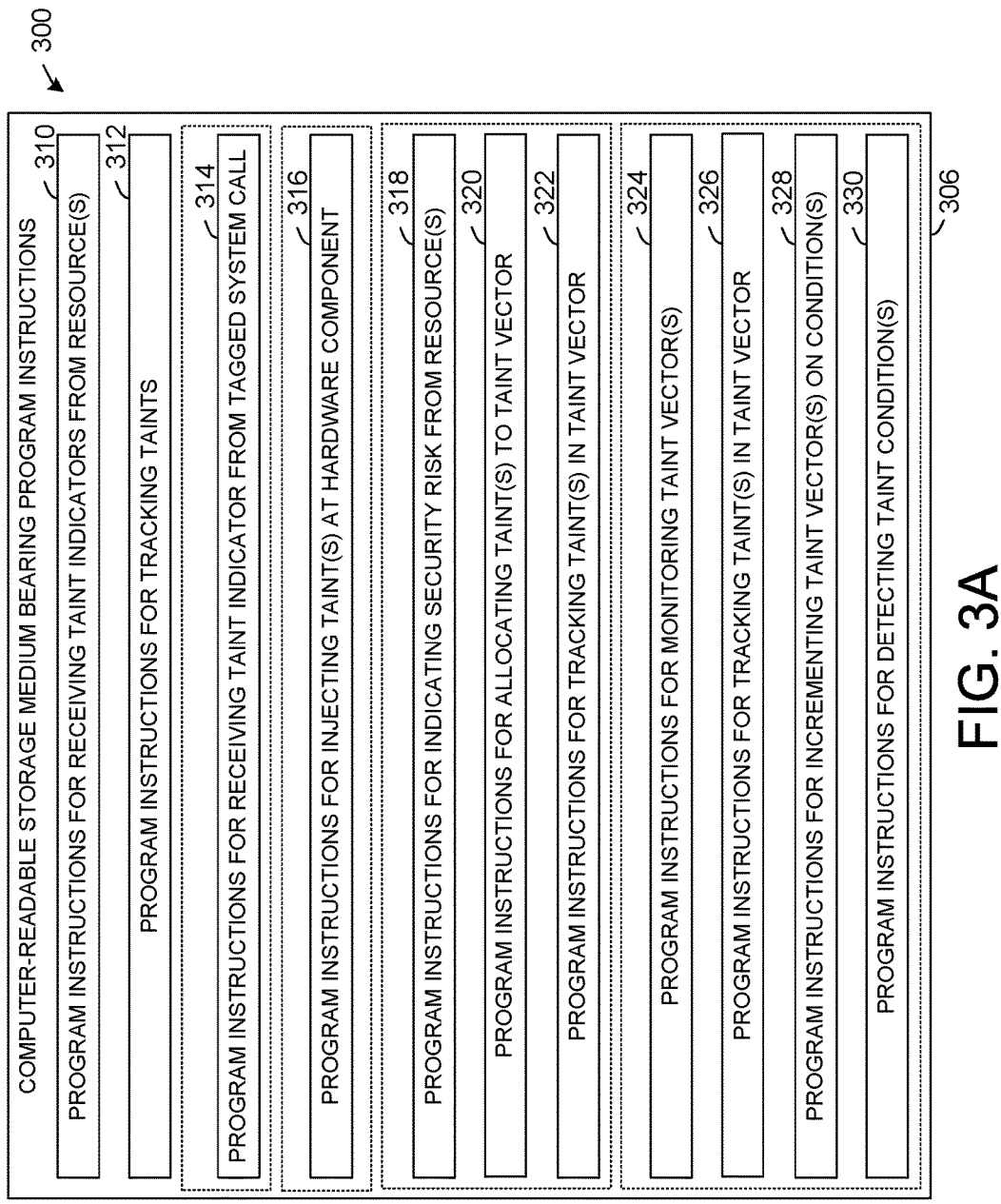
FIGS. 3A, 3B, and 3C are schematic block diagrams showing embodiments of a computer program product adapted to manage security risk by tracking taints and taint indications, and respond by trapping.
Figure 3B:
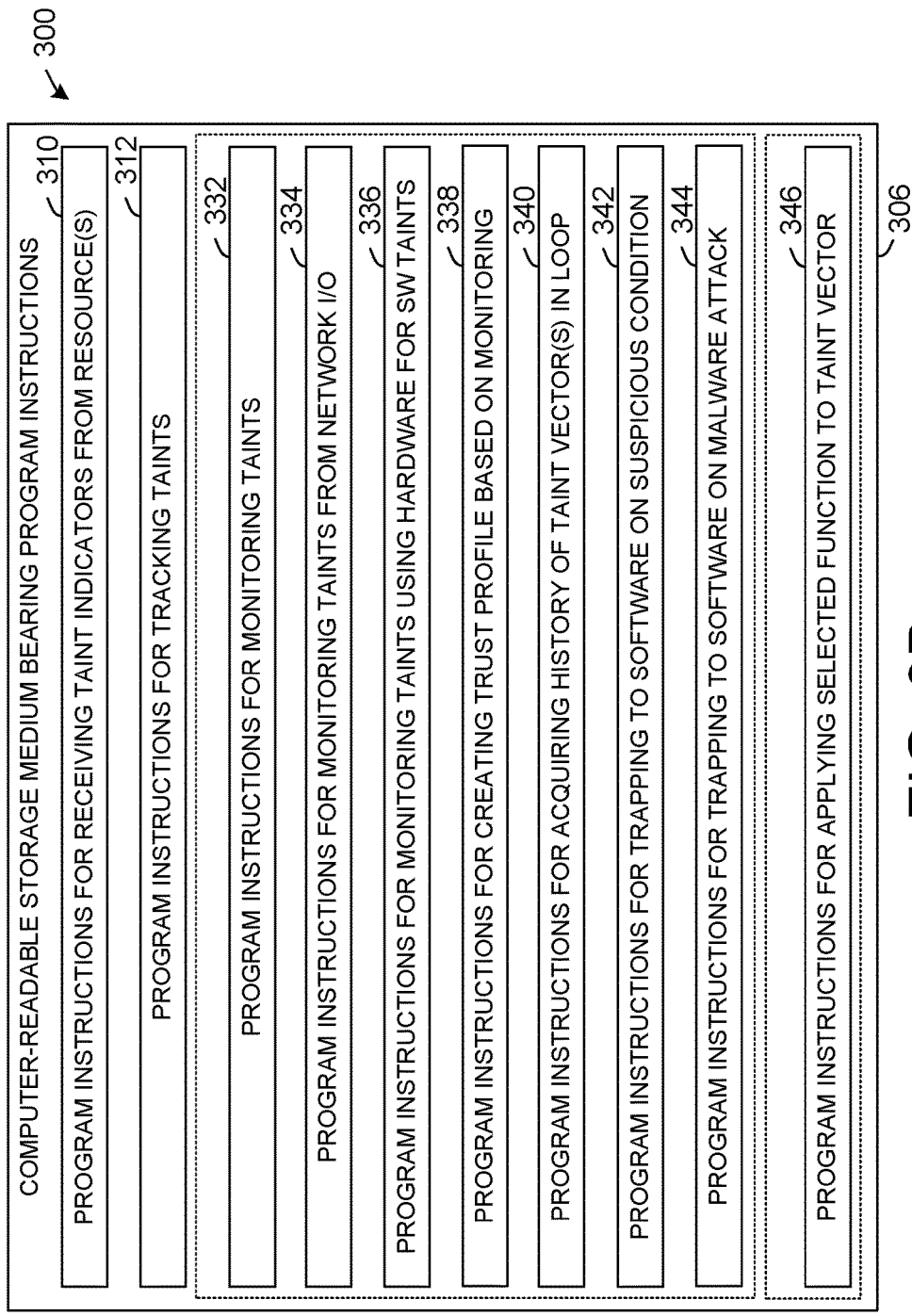
Figure 3C:
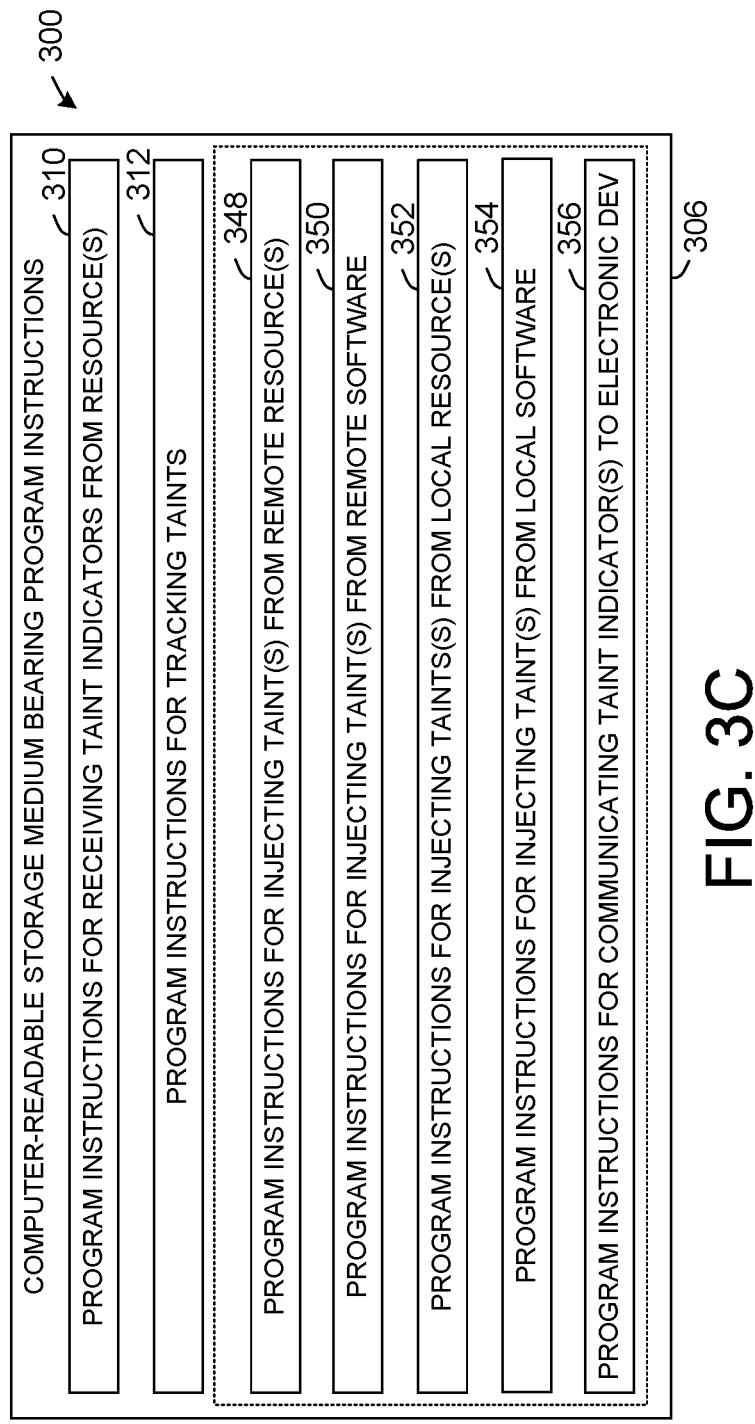

Referring to FIGS. 3A, 3B, and 3C, embodiments comprise a computer program product 300 adapted to manage security risk by accumulating and monitoring taint indications. The computer program product includes a computer-readable storage medium 306 bearing program instructions. The program instructions are operable to perform a process in a computing device. The computer program product can be constituted as any combination of one or more computer usable or computer readable medium(s), for example but not limited to, communication, electronic, semiconductor, magnetic, optical, electromagnetic, infrared, in the form of propagation medium, system, apparatus, device, or the like. Specific examples of the computer-readable medium may include, are not limited to, a wired connection, a wireless connection, Internet or an intranet transmission media, an optical fiber, a magnetic storage device, a portable diskette, a hard disk, a portable compact disc read-only memory (CDROM), an optical storage device, a random access memory (RAM), a read-only memory (ROM), an erasable programmable read-only memory (EPROM), Flash memory, or the like. Similarly, the computer-usable or computer-readable medium can be a visual display such as paper, poster, screen view, that can be visually or electronically captured such as by optical scanning of a medium, then compiled, interpreted, or otherwise processed.

As shown in FIG. 3A, the program instructions can comprise program instructions 310 operable to receive a plurality of taint indicators corresponding to at least one of a plurality of taints indicative of potential security risk and injected from at least one of a plurality of resources. The computer program product 300 can further comprise program instructions 312 operable to track the plurality of taints.

In some embodiments, the computer program product 300 can further comprise program instructions 314 operable to receive at least one taint indicator from a tagged system call associated with accessing information from a web page wherein an operating system injects a label originating from a browser at an identified site.

In various embodiments and/or applications, the computer program product 300 can further comprise program instructions 316 operable to inject at a hardware component at least one taint of the plurality of taints when the at least one taint is known a priori to indicate an event and/or condition is suspicious.

Further embodiments of the computer program product 300 can further comprise program instructions 318 operable to indicate potential security risk originating from at least one of the plurality of resources by at least one taint of the plurality of taints, program instructions 320 operable to allocate the at least one taint of the plurality of taints in at least one taint vector, and program instructions 322 operable to track the at least one taint in at least one taint vector.

Similarly, the computer program product 300 can further comprise program instructions 324 operable to monitor the at least one taint vector, program instructions 326 operable to track the at least one taint in at least one taint vector, program instructions 328 operable to increment the at least one taint vector upon detection of a predetermined taint condition wherein a predetermined condition of data is indicated, and program instructions 330 operable to detect a predetermined taint condition wherein a predetermined condition of data is indicated.

As shown in FIG. 3B, the program instructions can comprise program instructions 332 operable to monitor the plurality of taints, program instructions 334 operable to monitor the plurality of taints in network input/output operations, and program instructions 336 operable to monitor the plurality of taints using a hardware device for taint notifications inserted using a software process. The computer program product 300 can further comprise program instructions 338 operable to create a trust profile based on the monitoring, and program instructions 340 operable to acquire a history of the ones of the at least one taint vector in a feedback loop that correlates taints with responses to the taints. The computer program product 300 can further comprise program instructions 342 operable to trap to a software process based at least partly on determination of a suspicious condition, and program instructions 344 operable to trap to a software process based at least partly on determination of a network input/output condition of an attempt of malware to communicate to a malware operator.

In various embodiments and/or applications, the computer program product 300 can further comprise program instructions 346 operable to apply at least one function to the at least one entry of the at least one taint vector, wherein the at least one function is selected from a group consisting of weights, masks, sums, combinations, arithmetic functions, logical operations, and transforms.

Referring to FIG. 3C, further embodiments of the computer program product 300 can further comprise program instructions 348 operable program instructions operable to inject ones of the plurality of taints from a resource of the plurality of resources that is remote from an electronic device, program instructions 350 operable to inject ones of the plurality of taints from remote software that is remote from an electronic device, program instructions 352 operable to inject ones of the plurality of taints from a resource of the plurality of resources that is locally coupled to an electronic device wherein the at least one taint indicator corresponding to the injected ones of the plurality of taints is directly accessing by the electronic device, and program instructions 354 operable to inject ones of the plurality of taints by local software that is local to an electronic device wherein the at least one taint indicator corresponding to the injected ones of the plurality of taints is directly accessed by the electronic device. The computer program product 300 can further comprise program instructions 356 operable to communicate at least one taint indicator corresponding to the injected ones of the plurality of taints to the electronic device.

Figure 4A:
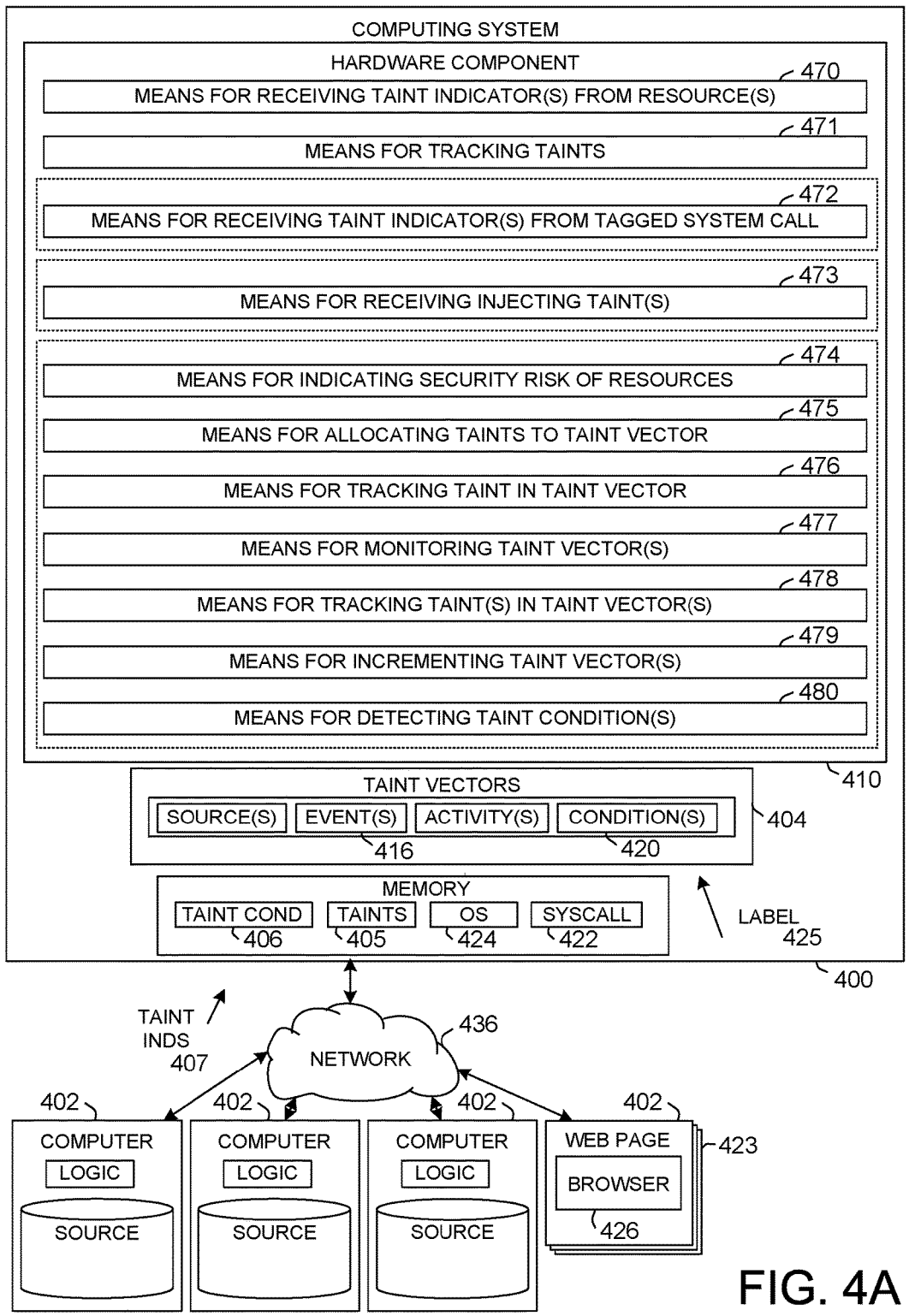
FIGS. 4A, 4B, and 4C are schematic block diagrams illustrating embodiments of a electronic device adapted to manage security risk by tracking taints and taint indications, and respond by trapping.
Figure 4B:
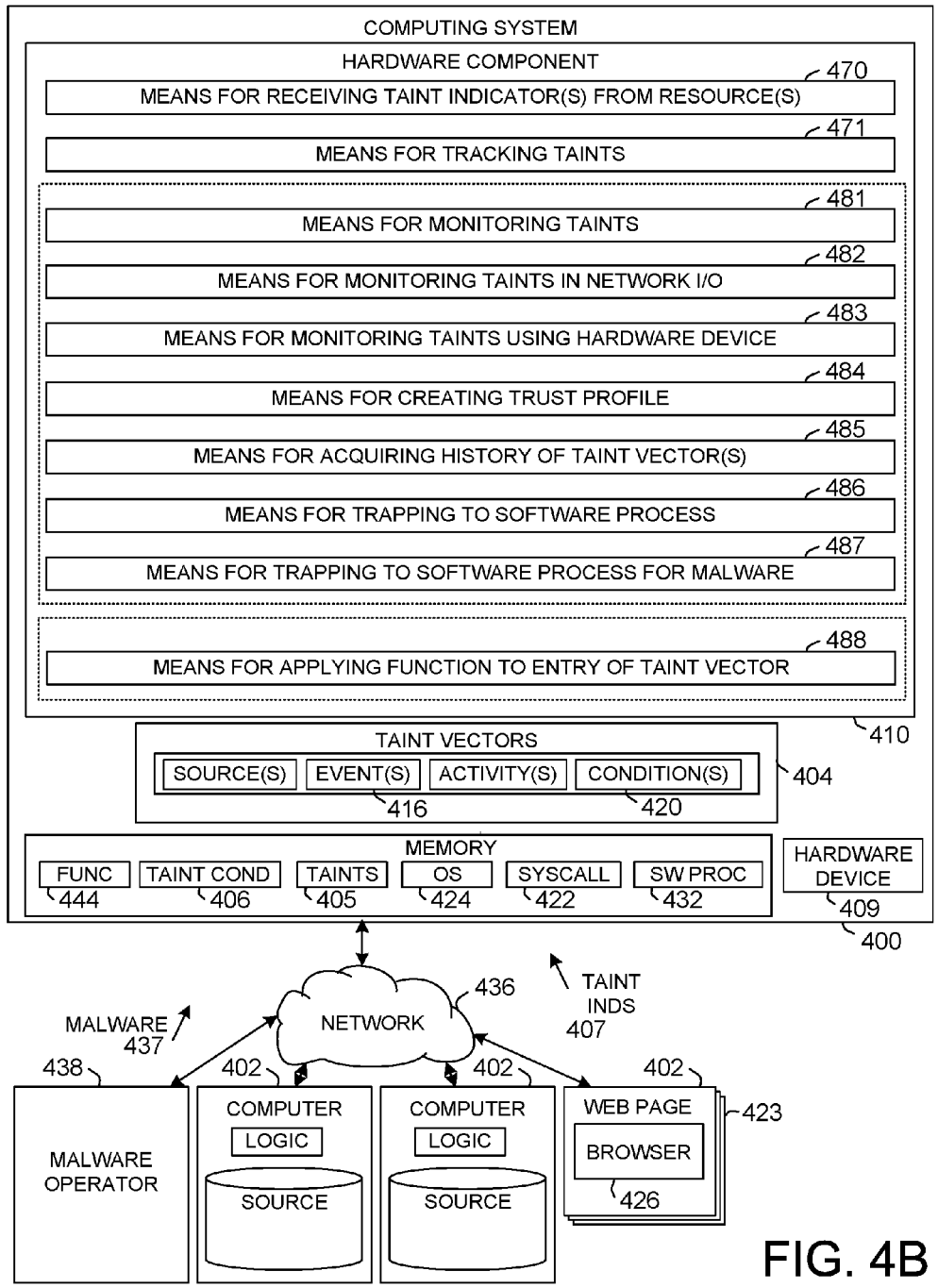
Figure 4C:
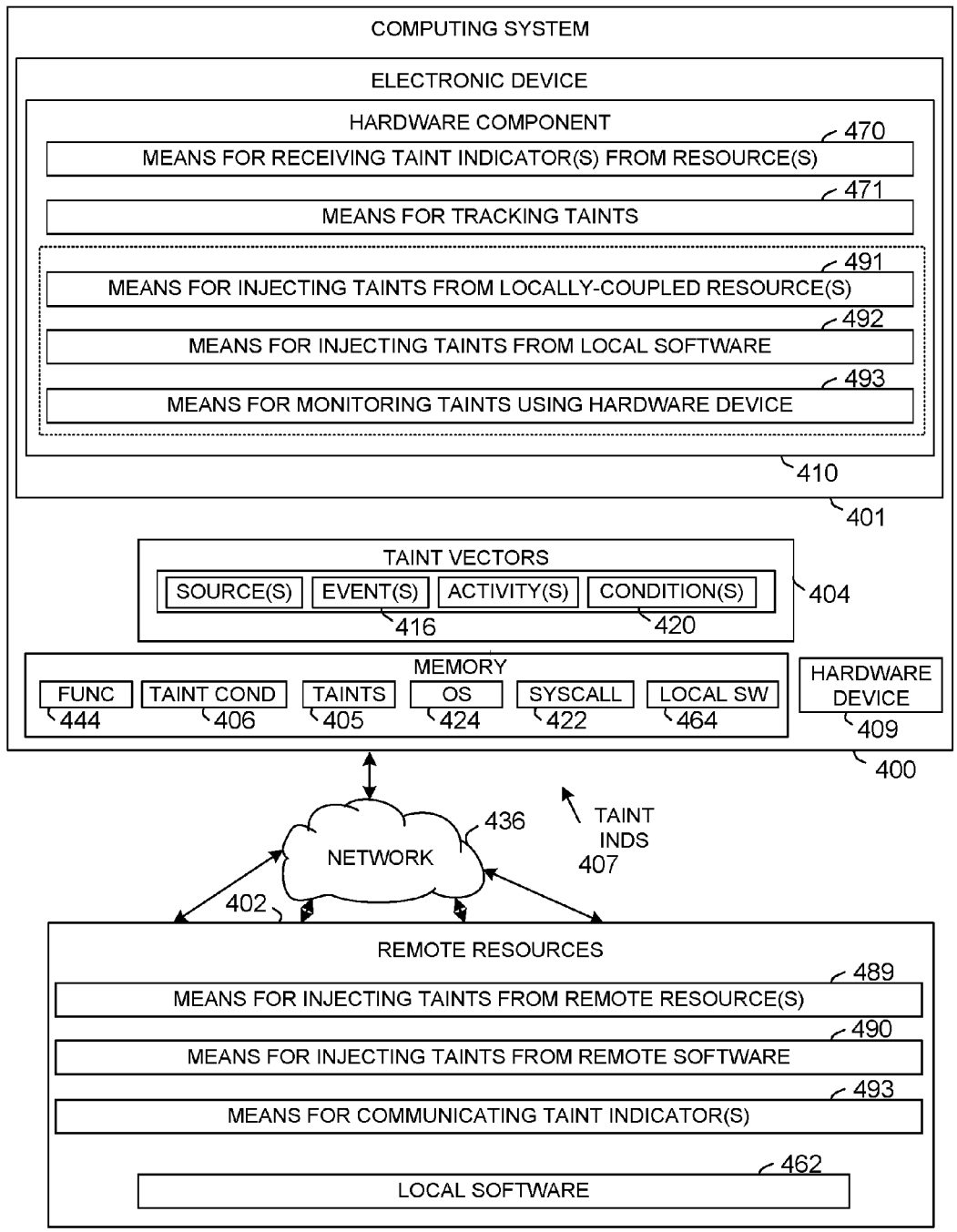

Referring to FIGS. 4A, 4B, and 4C, schematic block diagrams illustrate embodiments of a computing system 400 adapted to manage security risk by monitoring taint indications and responding to a determined taint condition, for example by trapping. The computing system 400 can comprise means 470 for receiving a plurality of taint indicators 407 corresponding to at least one of a plurality of taints 405 indicative of potential security risk and injected from at least one of a plurality of resources 402, and means 471 for tracking the plurality of taints 405.

In some embodiments, taints can originate from network users and resources. Accordingly, for example, the computing system 400 can further comprise means 472 for receiving at least one taint indicator 407 from a tagged system call 422 associated with accessing information from a web page 423 wherein an operating system 424 injects a label 425 originating from a browser 426 at an identified site.

In various embodiments and/or conditions, taints can be injected from hardware. Accordingly, the computing system 400 can further comprise means 473 for injecting at a hardware component 410 at least one taint 405 of the plurality of taints 405 when the at least one taint 405 is known a priori to indicate an event 416 and/or condition 420 is suspicious.

In further embodiments, the computing system 400 can further comprise means 474 for indicating potential security risk originating from at least one of the plurality of resources 402 by at least one taint 405 of the plurality of taints 405, means 475 for allocating the at least one taint 405 of the plurality of taints 405 in at least one taint vector 404, means 476 for tracking the at least one taint 405 in at least one taint vector 404, and means 477 for monitoring the at least one taint vector 404. In some embodiments, the computing system 400 can further comprise means 478 for tracking the at least one taint 405 in at least one taint vector 404, means 479 for incrementing the at least one taint vector 404 upon detection of a predetermined taint condition 406 wherein a predetermined condition of data is indicated, and means 480 for detecting a predetermined taint condition 406 wherein a predetermined condition of data is indicated.

Referring to FIG. 4B, in several embodiments various techniques for monitoring taints can be implemented. Accordingly, the computing system 400 can further comprise means 481 for monitoring the plurality of taints 405, means 482 for monitoring the plurality of taints 405 in network 436 input/output operations, and means 483 for monitoring the plurality of taints 405 using a hardware device 409 for taint notifications inserted using a software process 432. In some embodiments and/or applications, the computing system 400 can further comprise means 484 for creating a trust profile based on the monitoring, and means 485 for acquiring a history of the ones of the at least one taint vector 404 in a feedback loop that correlates taints 405 with responses to the taints 405. In various embodiments, the computing system 400 can respond to a predetermined taint condition by trapping. For example, the computing system 400 can further comprise means 486 for trapping to a software process 432 based at least partly on determination of a suspicious condition, and means 487 for trapping to a software process 432 based at least partly on determination of a network 436 input/output condition of an attempt of malware 437 to communicate to a malware operator 438.

In some embodiments and/or applications, the computing system 400 can further comprise means 488 for applying at least one function 444 to the at least one entry of the at least one taint vector 404, wherein the at least one function 444 is selected from a group consisting of weights, masks, sums, combinations, arithmetic functions, logical operations, and transforms.

Referring to FIG. 4C, in various embodiments, taints can be injected from diverse sources. For example, the computing system 400 can further comprise means 489 for injecting ones of the plurality of taints 405 from a resource 402 of the plurality of resources 402 that is remote from an electronic device 401, means 490 for injecting ones of the plurality of taints 405 from remote software 462 that is remote from an electronic device 401, means 491 for injecting ones of the plurality of taints 405 from a resource 402 of the plurality of resources 402 that is locally coupled to an electronic device 401 wherein the at least one taint indicator 407 corresponding to the injected ones of the plurality of taints 405 is directly accessing by the electronic device 401, means 492 for injecting ones of the plurality of taints 405 by local software 464 that is local to an electronic device 401 wherein the at least one taint indicator 407 corresponding to the injected ones of the plurality of taints 405 is directly accessed by the electronic device 401, and the like. In some embodiments and/or conditions, the computing system 400 can further comprise means 493 for communicating at least one taint indicator 407 corresponding to the injected ones of the plurality of taints 405 to the electronic device 401.

In the detailed description herein, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

Figure 5:
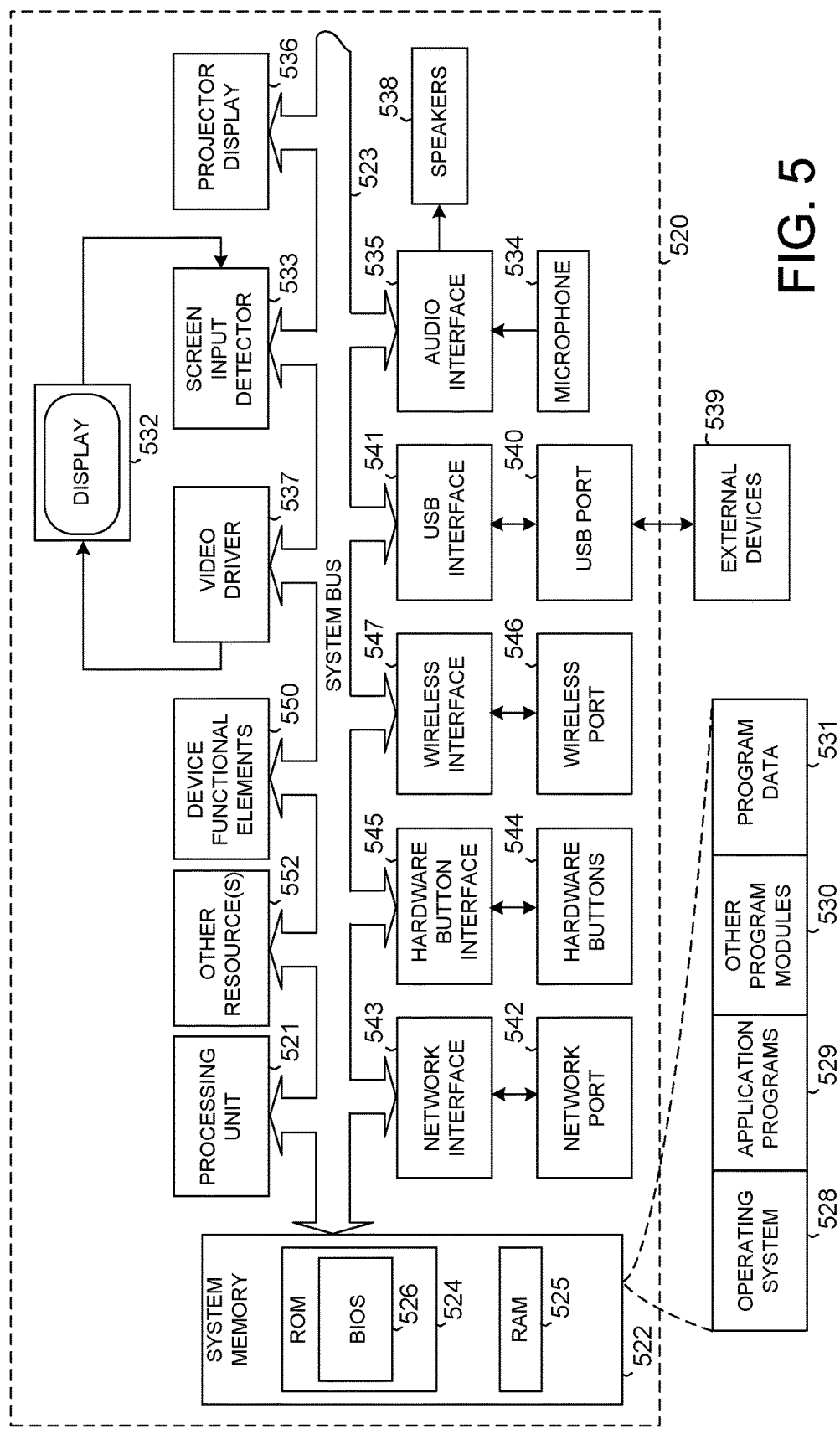
FIG. 5 is a schematic block diagram that shows an example embodiment of a computing device in which embodiments may be implemented.

FIG. 5 and the following discussion are intended to provide a brief, general description of an environment in which embodiments may be implemented. FIG. 5 illustrates an example system that includes a computing device 520, which may be included in an electronic device that also includes a device functional element 550. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a PDA, a Blackberry® device, a printer, a refrigerator, a car, and an airplane. The computing device 520 can include a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read-only memory (ROM) 524 and random access memory (RAM) 525. A basic input/output system (BIOS) 526, containing the basic routines that help to transfer information between sub-components within the thin computing device 520, such as during start-up, is stored in the ROM 524. A number of program modules may be stored in the ROM 524 and/or RAM 525, including an operating system 528, one or more application programs 529, other program modules 530 and program data 531.

A user may enter commands and information into the computing device 520 through input devices, such as a number of switches and buttons, illustrated as hardware buttons 544, connected to the system via a suitable interface 545. Input devices may further include a touch-sensitive display with suitable input detection circuitry, illustrated as a display 532 and screen input detector 533. The output circuitry of the touch-sensitive display 532 is connected to the system bus 523 via a video driver 537. Other input devices may include a microphone 534 connected through a suitable audio interface 535, and a physical hardware keyboard (not shown). Output devices may include at least one the display 532, or a projector display 536.

In addition to the display 532, the computing device 520 may include other peripheral output devices, such as at least one speaker 538. Other external input or output devices 539, such as a joystick, game pad, satellite dish, scanner or the like may be connected to the processing unit 521 through a USB port 540 and USB port interface 541, to the system bus 523. Alternatively, the other external input and output devices 539 may be connected by other interfaces, such as a parallel port, game port or other port. The computing device 520 may further include or be capable of connecting to a flash card memory (not shown) through an appropriate connection port (not shown). The computing device 520 may further include or be capable of connecting with a network through a network port 542 and network interface 243, and through wireless port 546 and corresponding wireless interface 547 may be provided to facilitate communication with other peripheral devices, including other computers, printers, and so on (not shown). It will be appreciated that the various components and connections shown are examples and other components and means of establishing communications links may be used.

The computing device 520 may be primarily designed to include a user interface. The user interface may include a character, a key-based, and/or another user data input via the touch sensitive display 532. The user interface may include using a stylus (not shown). Moreover, the user interface is not limited to an actual touch-sensitive panel arranged for directly receiving input, but may alternatively or in addition respond to another input device such as the microphone 534. For example, spoken words may be received at the microphone 534 and recognized. Alternatively, the computing device 520 may be designed to include a user interface having a physical keyboard (not shown).

The device functional elements 550 are typically application specific and related to a function of the electronic device, and is coupled with the system bus 523 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 6:
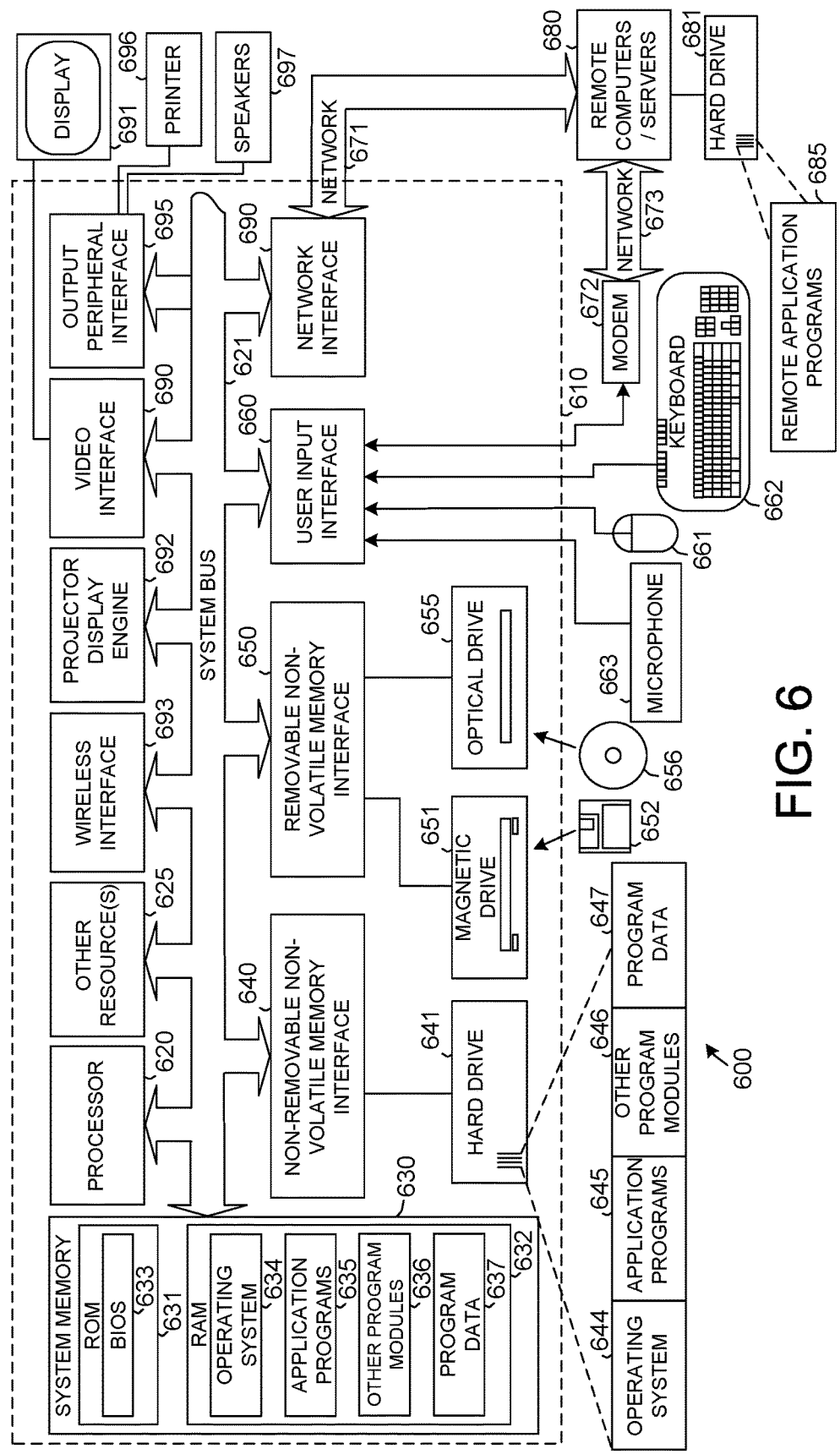
FIG. 6 is a schematic block diagram depicting an example embodiment of a general-purpose computing system in which embodiments may be implemented.

FIG. 6 illustrates an example embodiment of a general-purpose computing system in which embodiments may be implemented, shown as a computing system environment 600. Components of the computing system environment 600 may include, but are not limited to, a computing device 610 having a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 600 typically includes a variety of computer-readable media products. Computer-readable media may include any media that can be accessed by the computing device 610 and include both volatile and nonvolatile media, removable and non-removable media. By way of example, and not of limitation, computer-readable media may include computer storage media and communications media.

Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 610. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as a wired network and a direct-wired connection, and wireless media such as acoustic, RF, optical, and infrared media.

The system memory 630 includes computer storage media in the form of volatile and nonvolatile memory such as ROM 631 and RAM 632. A RAM may include at least one of a DRAM, an EDO DRAM, a SDRAM, a RDRAM, a VRAM, and/or a DDR DRAM. A basic input/output system (BIOS) 633, containing the basic routines that help to transfer information between elements within the computing device 610, such as during start-up, is typically stored in ROM 631. RAM 632 typically contains data and program modules that are immediately accessible to or presently being operated on by processing unit 620. By way of example, and not limitation, FIG. 6 illustrates an operating system 634, application programs 635, other program modules 636, and program data 637. Often, the operating system 634 offers services to applications programs 635 by way of one or more application programming interfaces (APIs) (not shown). Because the operating system 634 incorporates these services, developers of applications programs 635 need not redevelop code to use the services. Examples of APIs provided by operating systems such as Microsoft's "WINDOWS" are well known in the art.

The computing device 610 may also include other removable/non-removable, volatile/nonvolatile computer storage media products. By way of example only, FIG. 6 illustrates a non-removable non-volatile memory interface (hard disk interface) 640 that reads from and writes for example to non-removable, non-volatile magnetic media. FIG. 6 also illustrates a removable non-volatile memory interface 650 that, for example, is coupled to a magnetic disk drive 651 that reads from and writes to a removable, non-volatile magnetic disk 652, and/or is coupled to an optical disk drive 655 that reads from and writes to a removable, non-volatile optical disk 656, such as a CD ROM. Other removable/nonremovable, volatile/non-volatile computer storage media that can be used in the example operating environment include, but are not limited to, magnetic tape cassettes, memory cards, flash memory cards, DVDs, digital video tape, solid state RAM, and solid state ROM. The hard disk drive 641 is typically connected to the system bus 621 through a non-removable memory interface, such as the interface 640, and magnetic disk drive 651 and optical disk drive 655 are typically connected to the system bus 621 by a removable non-volatile memory interface, such as interface 650.

The drives and their associated computer storage media discussed above and illustrated in FIG. 6 provide storage of computer-readable instructions, data structures, program modules, and other data for the computing device 610. In FIG. 6, for example, hard disk drive 641 is illustrated as storing an operating system 644, application programs 645, other program modules 646, and program data 647. Note that these components can either be the same as or different from the operating system 634, application programs 635, other program modules 636, and program data 637. The operating system 644, application programs 645, other program modules 646, and program data 647 are given different numbers here to illustrate that, at a minimum, they are different copies.

A user may enter commands and information into the computing device 610 through input devices such as a microphone 663, keyboard 662, and pointing device 661, commonly referred to as a mouse, trackball, or touch pad. Other input devices (not shown) may include at least one of a touch sensitive display, joystick, game pad, satellite dish, and scanner. These and other input devices are often connected to the processing unit 620 through a user input interface 660 that is coupled to the system bus, but may be connected by other interface and bus structures, such as a parallel port, game port, or a universal serial bus (USB).

A display 691, such as a monitor or other type of display device or surface may be connected to the system bus 621 via an interface, such as a video interface 690. A projector display engine 692 that includes a projecting element may be coupled to the system bus. In addition to the display, the computing device 610 may also include other peripheral output devices such as speakers 697 and printer 696, which may be connected through an output peripheral interface 695.

The computing system environment 600 may operate in a networked environment using logical connections to one or more remote computers, such as a remote computer 680. The remote computer 680 may be a personal computer, a server, a router, a network PC, a peer device, or other common network node, and typically includes many or all of the elements described above relative to the computing device 610, although only a memory storage device 681 has been illustrated in FIG. 6. The network logical connections depicted in FIG. 6 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 600 is connected to the network 671 through a network interface, such as the network interface 670, the modem 672, and/or the wireless interface 693. The network may include a LAN network environment, and/or a WAN network environment, such as the Internet. In a networked environment, program modules depicted relative to the computing device 610, or portions thereof, may be stored in a remote memory storage device. By way of example, and not limitation, FIG. 6 illustrates remote application programs 685 as residing on computer storage medium 681. The network connections shown are examples and other means of establishing communications link between the computers may be used.

In various embodiments and/or conditions, responding to security risk in response to detection of the at least one security risk event can be one or more responses selected from a group of responses that range from relatively minor informational actions to actions which can moderately or substantially change system operations, or even terminate some or all system operations. Minor or informational responses can include including ignoring the at least one security risk event, logging the at least one security risk event, displaying a notification, displaying a warning message, generating an alarm, and the like. Responses affecting system operations can include preventing a memory and/or register write, modifying operating frequency, modifying operating voltage, modifying another operating parameter, performing a system call, and others. More drastic responses that can moderately or substantially affect operations can include calling a trap and/or exception, terminating operation of selected resources, activating a system shutdown, and the like.

Terms "substantially", "essentially", or "approximately", that may be used herein, relate to an industry-accepted variability to the corresponding term. Such an industry-accepted variability ranges from less than one percent to twenty percent and corresponds to, but is not limited to, materials, shapes, sizes, functionality, values, process variations, and the like. The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

The illustrative pictorial diagrams depict structures and process actions in a manufacturing process. Although the particular examples illustrate specific structures and process acts, many alternative implementations are possible and commonly made by simple design choice. Manufacturing actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, shapes, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. An electronic device comprising:
   at least one input interface operable to receive at least one of read requests or write requests to access data associated with at least one of a plurality of resources;
   at least one taint vector including a plurality of vector fields configured for facilitating monitoring of one or more taints associated with the at least one of read requests or write requests to access data associated with at least one of a plurality of resources, wherein the plurality of vector fields include at least one field configured for describing the at least one of the plurality of resources, at least one field configured for specifying permission to access the at least one of the plurality of resources allocated to a requestor of the at least one of read requests or write requests to access data associated with the at least one of a plurality of resources, and at least one field configured for specifying at least one taint associated with one or more accesses of the at least one of the plurality of resources; and
   circuitry configured for monitoring the one or more accesses of the at least one of the plurality of resources wherein the monitoring the one or more accesses includes at least detecting the at least one taint and updating the at least one field configured for specifying at least one taint.

2. The electronic device according to claim 1 wherein the at least one input interface operable to receive at least one of read requests or write requests to access data associated with at least one of a plurality of resources comprises:
   at least one input interface operable to receive at least one of read requests or write requests from at least one of processors, central processing units (CPUs), graphics hardware, network controllers, memory, memory management, hardware, microarchitecture, sound cards, video cards, network interfaces, instruction set architecture (ISA), library calls, library functions, software objects, compilers, or operating systems.

3. The electronic device according to claim 1 wherein the plurality of resources comprises:
   at least one of processors, central processing units (CPUs), graphics hardware, network controllers, memory, memory management, hardware, microarchitecture, sound cards, video cards, network interfaces, instruction set architecture (ISA), library calls, library functions, software objects, compilers, or operating systems.

4. The electronic device according to claim 1 wherein the plurality of resources comprises:
   at least one of memory portions, memory blocks, read-only memory, random access memory, non-volatile memory, or volatile memory.

5. The electronic device according to claim 1 wherein the at least one taint vector including a plurality of vector fields configured for facilitating monitoring of one or more taints associated with the at least one of read requests or write requests to access data associated with at least one of a plurality of resources comprises:
   at least one taint vector including a plurality of vector fields configured for facilitating monitoring of one or more taints associated with the at least one of read requests or write requests to access data associated with at least one of a plurality of resources, wherein the plurality of vector fields further includes at least one field configured for specifying at least one attribute of the requestor of the at least one of read requests or write requests to access data associated with the at least one of a plurality of resources.

6. The electronic device according to claim 1 wherein the at least one taint vector including a plurality of vector fields configured for facilitating monitoring of one or more taints associated with the at least one of read requests or write requests to access data associated with at least one of a plurality of resources comprises:
   at least one taint vector including a plurality of vector fields configured for facilitating monitoring of one or more taints associated with the at least one of read requests or write requests to access data associated with at least one of a plurality of resources, wherein the plurality of vector fields further includes at least one field configured for specifying at least one granularity of the at least one of the plurality of resources.

7. The electronic device according to claim 1 wherein the at least one taint vector including a plurality of vector fields configured for facilitating monitoring of one or more taints associated with the at least one of read requests or write requests to access data associated with at least one of a plurality of resources comprises:
  at least one taint vector including a plurality of vector fields configured for facilitating monitoring of one or more taints associated with the at least one of read requests or write requests to access data associated with at least one of a plurality of resources, wherein the plurality of vector fields further includes at least one field configured for specifying at least one granularity of the at least one of the plurality of resources including at least specifying at least one start address and at least one end address.

8. The electronic device according to claim 1 wherein the at least one taint vector including a plurality of vector fields configured for facilitating monitoring of one or more taints associated with the at least one of read requests or write requests to access data associated with at least one of a plurality of resources comprises:
  at least one taint vector including a plurality of vector fields configured for facilitating monitoring of one or more taints associated with the at least one of read requests or write requests to access data associated with at least one of a plurality of resources, wherein the plurality of vector fields further includes at least one field configured for specifying at least one granularity of the at least one of the plurality of resources including at least specifying at least one of:
   specifying a memory page;
   specifying a byte;
   specifying a word;
   specifying a memory block;
   specifying a hardware process identifier (PID);
   allocating taints to enable a cross-thread taint;
   allocating taints among hardware devices;
   specifying a component; or
   specifying a software component.

9. The electronic device according to claim 1 wherein the at least one taint vector including a plurality of vector fields configured to facilitate monitoring of one or more taints associated with the at least one of read requests or write requests to access data associated with at least one of a plurality of resources comprises:
  at least one taint vector including a plurality of vector fields configured to facilitate monitoring of one or more taints associated with the at least one of read requests or write requests to access data associated with at least one of a plurality of resources, wherein the plurality of vector fields further includes at least one field configured to specify at least one level of criticality associated with at least one taint associated with one or more accesses of the at least one of the plurality of resources.

10. The electronic device according to claim 9 further comprising:
  response logic configured for responding to the detection of the at least one taint with at least one response based at least partially on the at least one level of criticality associated with at least one taint associated with one or more accesses of the at least one of the plurality of resources.

11. The electronic device according to claim 9 further comprising:
  response logic configured for responding to the detection of the at least one taint with at least one response based at least partially on a predetermined critical level of criticality associated with at least one taint associated with one or more accesses of the at least one of the plurality of resources wherein the response includes at least one of:
   ignoring the at least one security risk event;
   logging the at least one security risk event;
   displaying a notification;
   displaying a warning message; or
   generating an alarm.

12. The electronic device according to claim 9 further comprising:
  response logic configured for responding to the detection of the at least one taint with at least one response based at least partially on a predetermined critical level of criticality associated with at least one taint associated with one or more accesses of the at least one of the plurality of resources wherein the response includes at least one of:
   preventing a memory and/or register write;
   modifying operating frequency;
   modifying operating voltage;
   modifying an operating parameter;
   performing a system call;
   calling a trap and/or exception;
   terminating operation of selected resources; or
   activating a system shutdown.

13. The electronic device according to claim 1 further comprising:
  response logic configured for responding to the detection of the at least one taint with at least one response including at least one of:
   ignoring the at least one security risk event;
   logging the at least one security risk event;
   displaying a notification;
   displaying a warning message;
   generating an alarm;
   preventing a memory and/or register write;
   modifying operating frequency;
   modifying operating voltage;
   modifying an operating parameter;
   performing a system call;
   calling a trap and/or exception;
   terminating operation of selected resources; or
   activating a system shutdown.

14. The electronic device according to claim 1 wherein the one or more taints associated with the at least one of read requests or write requests to access data associated with at least one of a plurality of resources comprise:
  at least one of:
   a null pointer reference;
   an attempt to access a secured part of a processor;
   an attempt to access a secured resource;
   a buffer overrun;
   an event originating in a region that raises suspicion;
   a fault;
   an integer overflow;
   a plurality of taint indicators that exceeds at least one predetermined threshold;
   a taint indicated by power law analysis;
   a taint indicated by a race function; or
   an attempt to access a key.

15. The electronic device according to claim 1 wherein the one or more taints associated with the at least one of read requests or write requests to access data associated with at least one of a plurality of resources comprise:

at least one of a distinct affiliate, a system characteristic, a source, an event, an activity, metadata, or a condition.

16. The electronic device according to claim 1 wherein the circuitry configured for monitoring the one or more accesses of the at least one of the plurality of resources including circuitry configured for detecting the at least one taint and circuitry configured for updating the at least one field configured for specifying at least one taint comprises:
   circuitry configured for monitoring the plurality of taints; and
   circuitry configured for creating a trust profile based on the monitoring.

17. The electronic device according to claim 1 wherein the circuitry configured for monitoring the one or more accesses of the at least one of the plurality of resources including circuitry configured for detecting the at least one taint and circuitry configured for updating the at least one field configured for specifying at least one taint comprises:
   circuitry configured for detecting at least one violation of the specified permission to access the at least one of the plurality of resources allocated to a requestor of the at least one of read requests or write requests to access data associated with the at least one of a plurality of resources.

18. The electronic device according to claim 1 wherein the circuitry configured for monitoring the one or more accesses of the at least one of the plurality of resources including circuitry configured for detecting the at least one taint and circuitry configured for updating the at least one field configured for specifying at least one taint comprises:
   circuitry configured for detecting at least one violation of at least one of prohibitions of memory locations to which data is written, prohibitions of when program code is allowed to execute, prohibitions of how long writing is allowed, prohibitions of specified purposes to which data written, or prohibitions of a number of times data is written.

19. A method for operating and electronic device comprising:
   receiving at least one of read requests or write requests to access data associated with at least one of a plurality of resources;
   allocating at least one taint vector including a plurality of vector fields configured for facilitating monitoring of one or more taints associated with the at least one of read requests or write requests to access data associated with at least one of a plurality of resources, wherein the plurality of vector fields include at least one field configured for describing the at least one of the plurality of resources, at least one field configured for specifying permission to access the at least one of the plurality of resources allocated to a requestor of the at least one of read requests or write requests to access data associated with the at least one of a plurality of resources, and at least one field configured for specifying at least one taint associated with one or more accesses of the at least one of the plurality of resources; and
   monitoring the one or more accesses of the at least one of the plurality of resources wherein the monitoring one or more accesses includes at least detecting the at least one taint and updating the at least one field configured for specifying at least one taint.

20. An electronic device comprising:
   at least one input interface operable to receive at least one of read requests or write requests to access data associated with at least one of a plurality of resources;
   at least one taint vector including a plurality of vector fields configured for facilitating monitoring of one or more taints associated with the at least one of read requests or write requests to access data associated with at least one of a plurality of resources, wherein the plurality of vector fields include at least one field configured for describing the at least one of the plurality of resources, at least one field configured for specifying at least one granularity of the at least one of the plurality of resources, and at least one field configured for specifying at least one taint associated with one or more accesses of the at least one of the plurality of resources; and
   circuitry configured for monitoring the one or more accesses of the at least one of the plurality of resources wherein the monitoring the one or more accesses includes at least detecting the at least one taint and updating the at least one field configured for specifying at least one taint.

* * * * *